United States Patent
Gannu et al.

(10) Patent No.: US 8,909,624 B2
(45) Date of Patent: Dec. 9, 2014

(54) SYSTEM AND METHOD FOR EVALUATING RESULTS OF A SEARCH QUERY IN A NETWORK ENVIRONMENT

(75) Inventors: Satish K. Gannu, San Jose, CA (US); Sonali Mihir Sambhus, Milpitas, CA (US); Yicheng Tao, San Jose, CA (US); Kenneth A. Durazzo, San Ramon, CA (US); Leon A. Frazier, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/149,405

(22) Filed: May 31, 2011

(65) Prior Publication Data

US 2012/0310926 A1 Dec. 6, 2012

(51) Int. Cl.
*G06F 17/30* (2006.01)
*G06Q 30/02* (2012.01)

(52) U.S. Cl.
CPC .......... *G06Q 30/02* (2013.01); *G06F 17/30867* (2013.01); *G06F 17/30702* (2013.01)
USPC .......................................... 707/723; 705/321

(58) Field of Classification Search
None
See application file for complete search history.

(56) References Cited

U.S. PATENT DOCUMENTS

| | | |
|---|---|---|
| 5,613,032 A | 3/1997 | Cruz et al. |
| 5,677,901 A | 10/1997 | Iwamura |
| 5,857,179 A | 1/1999 | Vaithyanathan et al. |
| 5,961,582 A | 10/1999 | Gaines |
| 6,012,053 A | 1/2000 | Pant et al. |
| 6,026,388 A | 2/2000 | Liddy et al. |
| 6,301,586 B1 | 10/2001 | Yang et al. |
| 6,304,283 B1 | 10/2001 | Kitagawa |
| 6,345,253 B1 | 2/2002 | Viswanathan |
| 6,697,793 B2 | 2/2004 | McGreevy |
| 6,980,660 B1 | 12/2005 | Hind et al. |
| 7,017,183 B1 | 3/2006 | Frey et al. |
| 7,072,837 B2 | 7/2006 | Kemble et al. |
| 7,099,867 B2 | 8/2006 | Okada et al. |
| 7,260,312 B2 | 8/2007 | Srinivasan et al. |
| 7,292,532 B2 | 11/2007 | Sakata et al. |
| 7,350,227 B2 | 3/2008 | McGrew et al. |
| 7,417,959 B2 | 8/2008 | Dorner et al. |
| 7,457,808 B2 | 11/2008 | Gaussier et al. |

(Continued)

FOREIGN PATENT DOCUMENTS

| | | |
|---|---|---|
| CN | 102648464 A | 8/2012 |
| EP | 2483803 | 4/2011 |

(Continued)

OTHER PUBLICATIONS

U.S. Appl. No. 13/364,102, filed Feb. 1, 2012 entitled "System and Method for Creating Customized On-Demand Video Reports in a Network Environment," Inventor(s): Deepti Patil, et al.

(Continued)

*Primary Examiner* — Wilson Lee
(74) *Attorney, Agent, or Firm* — Patent Capital Group

(57) ABSTRACT

A method is provided in one example and includes receiving results for a search query initiated by a user; evaluating the results in relation to a personal profile of the user. The personal profile includes a plurality of characteristics associated with the user. The method also includes ranking the results based on the evaluation in order to generate a resultant that reflects a ranking of the results, and communicating the resultant to the user.

18 Claims, 8 Drawing Sheets

(56) References Cited

U.S. PATENT DOCUMENTS

| | | |
|---|---|---|
| 7,493,369 B2 | 2/2009 | Horvitz et al. |
| 7,509,491 B1 | 3/2009 | Wainner et al. |
| 7,603,350 B1 | 10/2009 | Guha |
| 7,617,451 B2 | 11/2009 | Jones et al. |
| 7,698,442 B1 | 4/2010 | Krishnamurthy et al. |
| 7,706,265 B2 | 4/2010 | Monette et al. |
| 7,809,714 B1 | 10/2010 | Smith |
| 7,818,215 B2 | 10/2010 | King et al. |
| 7,827,191 B2 | 11/2010 | Williams |
| 7,853,553 B2 | 12/2010 | Lankinen et al. |
| 7,913,176 B1 | 3/2011 | Blattner et al. |
| 8,015,250 B2 | 9/2011 | Kay |
| 8,051,204 B2 | 11/2011 | Kai et al. |
| 8,214,209 B2 | 7/2012 | Nagatomo |
| 8,255,386 B1 | 8/2012 | Annau et al. |
| 8,260,774 B1 | 9/2012 | Aggarwal |
| 8,374,983 B1 | 2/2013 | Pohl et al. |
| 2002/0032772 A1 | 3/2002 | Olstad et al. |
| 2002/0035605 A1 | 3/2002 | McDowell et al. |
| 2002/0087311 A1 | 7/2002 | Leung Lee et al. |
| 2002/0091741 A1 | 7/2002 | Ferreira et al. |
| 2002/0093915 A1 | 7/2002 | Larson |
| 2003/0014399 A1 | 1/2003 | Hansen et al. |
| 2003/0014448 A1 | 1/2003 | Castellanos et al. |
| 2003/0014586 A1 | 1/2003 | Mitsuda et al. |
| 2003/0028773 A1 | 2/2003 | McGarvey et al. |
| 2003/0028896 A1 | 2/2003 | Swart et al. |
| 2003/0033288 A1 | 2/2003 | Shanahan et al. |
| 2003/0074555 A1 | 4/2003 | Fahn et al. |
| 2003/0093789 A1 | 5/2003 | Zimmerman et al. |
| 2004/0049714 A1 | 3/2004 | Marples et al. |
| 2004/0158609 A1 | 8/2004 | Daniell et al. |
| 2004/0193426 A1 | 9/2004 | Maddux et al. |
| 2004/0208123 A1 | 10/2004 | Sakata et al. |
| 2004/0258396 A1 | 12/2004 | Nakamura et al. |
| 2005/0004922 A1 | 1/2005 | Zernik |
| 2005/0060283 A1 | 3/2005 | Petras et al. |
| 2005/0063352 A1 | 3/2005 | Amara et al. |
| 2005/0068167 A1 | 3/2005 | Boyer et al. |
| 2005/0076198 A1 | 4/2005 | Skomra et al. |
| 2005/0086197 A1 | 4/2005 | Boubez et al. |
| 2005/0102522 A1 | 5/2005 | Kanda |
| 2005/0108001 A1 | 5/2005 | Aarskog |
| 2005/0160166 A1 | 7/2005 | Kraenzel |
| 2005/0272405 A1 | 12/2005 | Tomlinson et al. |
| 2006/0048210 A1 | 3/2006 | Hildre et al. |
| 2006/0149781 A1 | 7/2006 | Blankinship |
| 2006/0150253 A1 | 7/2006 | Feuerstein et al. |
| 2006/0168213 A1 | 7/2006 | Richardson et al. |
| 2006/0206483 A1 | 9/2006 | Knepper et al. |
| 2006/0224587 A1 | 10/2006 | Zamir et al. |
| 2006/0285493 A1 | 12/2006 | Manuja et al. |
| 2007/0016583 A1 | 1/2007 | Lempel et al. |
| 2007/0038437 A1 | 2/2007 | Brun |
| 2007/0106908 A1 | 5/2007 | Miyazaki et al. |
| 2007/0118275 A1 | 5/2007 | Qi et al. |
| 2007/0198725 A1 | 8/2007 | Morris |
| 2007/0206617 A1 | 9/2007 | Andreasen et al. |
| 2007/0239680 A1 | 10/2007 | Oztekin et al. |
| 2007/0239837 A1 | 10/2007 | Jablokov et al. |
| 2007/0244892 A1 | 10/2007 | Narancic |
| 2007/0253682 A1 | 11/2007 | Chang et al. |
| 2007/0260684 A1 | 11/2007 | Sharma et al. |
| 2007/0266020 A1 | 11/2007 | Case et al. |
| 2007/0294265 A1 | 12/2007 | Askew et al. |
| 2008/0027981 A1 | 1/2008 | Wahl |
| 2008/0060055 A1 | 3/2008 | Lau |
| 2008/0065892 A1 | 3/2008 | Bailey et al. |
| 2008/0077791 A1 | 3/2008 | Lund et al. |
| 2008/0091670 A1 | 4/2008 | Ismalon |
| 2008/0097985 A1 | 4/2008 | Olstad et al. |
| 2008/0104128 A1 | 5/2008 | Drayer et al. |
| 2008/0126690 A1 | 5/2008 | Rajan et al. |
| 2008/0140674 A1 | 6/2008 | Ishikawa |
| 2008/0154873 A1 | 6/2008 | Redlich et al. |
| 2008/0184326 A1 | 7/2008 | Nakajima |
| 2008/0222142 A1 | 9/2008 | O'Donnell |
| 2008/0244740 A1 | 10/2008 | Hicks et al. |
| 2008/0294903 A1 | 11/2008 | Miyazaki et al. |
| 2008/0295040 A1 | 11/2008 | Crinon |
| 2008/0313144 A1 | 12/2008 | Huston |
| 2009/0006333 A1 | 1/2009 | Jones et al. |
| 2009/0049053 A1 | 2/2009 | Barker et al. |
| 2009/0055175 A1 | 2/2009 | Terrell et al. |
| 2009/0119278 A1 | 5/2009 | Cross et al. |
| 2009/0182727 A1 | 7/2009 | Majko |
| 2009/0196570 A1 | 8/2009 | Dudas et al. |
| 2009/0210715 A1 | 8/2009 | Izu et al. |
| 2009/0226870 A1 | 9/2009 | Minotti |
| 2009/0234497 A1 | 9/2009 | Uejo |
| 2009/0234834 A1 | 9/2009 | Cozzi |
| 2009/0254572 A1 | 10/2009 | Redlich et al. |
| 2009/0276377 A1 | 11/2009 | Dutta et al. |
| 2009/0293016 A1 | 11/2009 | Potevin et al. |
| 2009/0319365 A1 | 12/2009 | Waggoner et al. |
| 2009/0327271 A1 | 12/2009 | Amitay et al. |
| 2010/0005306 A1 | 1/2010 | Izu et al. |
| 2010/0010968 A1 | 1/2010 | Redlich et al. |
| 2010/0057815 A1 | 3/2010 | Spivack et al. |
| 2010/0088331 A1 | 4/2010 | White et al. |
| 2010/0153855 A1 | 6/2010 | Roberts et al. |
| 2010/0179801 A1 | 7/2010 | Huynh et al. |
| 2010/0217975 A1 | 8/2010 | Grajek et al. |
| 2010/0223581 A1 | 9/2010 | Manolescu et al. |
| 2010/0223629 A1 | 9/2010 | Appelbaum et al. |
| 2010/0250547 A1 | 9/2010 | Grefenstette et al. |
| 2010/0274815 A1* | 10/2010 | Vanasco ............... 707/798 |
| 2010/0280985 A1 | 11/2010 | Duchon et al. |
| 2010/0306816 A1 | 12/2010 | McGrew et al. |
| 2011/0077936 A1 | 3/2011 | Arumugam et al. |
| 2011/0078167 A1 | 3/2011 | Sundaresan et al. |
| 2011/0078550 A1 | 3/2011 | Nabutovsky |
| 2011/0099195 A1 | 4/2011 | Patwardhan et al. |
| 2011/0119264 A1 | 5/2011 | Hu et al. |
| 2011/0161409 A1 | 6/2011 | Nair et al. |
| 2011/0173260 A1 | 7/2011 | Biehl et al. |
| 2011/0196802 A1* | 8/2011 | Ellis et al. ............... 705/321 |
| 2011/0208522 A1 | 8/2011 | Pereg et al. |
| 2011/0225048 A1 | 9/2011 | Nair |
| 2011/0231296 A1 | 9/2011 | Gross et al. |
| 2011/0252330 A1 | 10/2011 | Catlin et al. |
| 2011/0270709 A1 | 11/2011 | Lewis et al. |
| 2011/0270843 A1 | 11/2011 | Albin |
| 2011/0304685 A1 | 12/2011 | Khedouri et al. |
| 2012/0002544 A1 | 1/2012 | Kokku et al. |
| 2012/0030232 A1 | 2/2012 | John et al. |
| 2012/0046936 A1 | 2/2012 | Kandekar et al. |
| 2012/0078952 A1* | 3/2012 | Araya ............... 707/769 |
| 2012/0081506 A1 | 4/2012 | Marvit |
| 2012/0102050 A1* | 4/2012 | Button et al. ............... 707/749 |
| 2012/0110087 A1* | 5/2012 | Culver et al. ............... 709/205 |
| 2012/0185239 A1 | 7/2012 | Goud et al. |
| 2012/0271805 A1 | 10/2012 | Holenstein et al. |

FOREIGN PATENT DOCUMENTS

| | | |
|---|---|---|
| WO | WO02/42864 | 5/2002 |
| WO | WO02/42940 | 5/2002 |
| WO | WO2011/041443 | 4/2011 |
| WO | WO 2012/173780 | 12/2012 |

OTHER PUBLICATIONS

Jadhav, N.S. and I.N. Dwivedi, "Social computing based personal vocabulary building," 5 pages; printed Sep. 30, 2009; http://www.priorartdatabase.com/IPCOM/000173550/.

Kohl, J. and C. Neuman, The Kerberos Network Authentication Service (V5), Network Working Group, RFC 1510, Sep. 1993, 105 pages, http://www.ietf.org/rfc/rfc1510.

Lacher, Martin S., et al., "On the Integration of Topic Maps and RDF Data," Extreme Markup Languages 2001, 14 pages.

U.S. Appl. No. 13/160,701, filed Jun. 15, 2011 entitled "System and Method for Discovering Videos," Inventor(s) Ashutosh A. Malegaonkar, et al.

(56) References Cited

OTHER PUBLICATIONS

"The LNTS Leap: Phoneme Recognition," 2 pages; printed Sep. 30, 2009; http://www.Intstech.com.
Billi, R., et al., "Interactive Voice Technology at Work: The CSELT Experience,"2$^{nd}$ IEEE Workshop on Interactive Voice Technology for Telecommunications Applications (IVTTA94); Sep. 26-27, 1994; pp. 43-48; http://ieeexplore.ieee.org/stamp/stamp.jsp?arnumber=00341547.
Carnegie Mellon University, "Speech at CMU," 4 pages; printed Sep. 30, 2009; http://www.speech.cs.cmu.edu/speech/.
Caslon Analytics Echelon Note: Overview, May 2006, 6 pages; printed Sep. 30, 2009 http://www.caslon.com.au/echelonnote.htm.
Chen, Hsinchun, et al., "A Concept Space Approach to Addressing the Vocabulary Problem in Scientific Information Retrieval: An Experiment on the Worm Community System," Journal of the American Society for Information Science Wiley for Asis USA, vol. 48, No. 1, Jan. 1997, XP002614340, ISSN: 0002-8231; pp. 17-31.
Chen, Rung-Ching, et al., "Adding New Concepts on the Domain Ontology Based on Semantic Similarity," International Conference on Business and Information, Jul. 12-14, 2006, XP002614339; 14 pages; http://bai2006.atisr.org/CD/Papers/2006bai6169.pdf.
PCT Notification of Transmittal (1 page) of the International Search Report (3 pages), and Written Opinion of the International Searching Authority, or the Declaration (6 pages) mailed Jan. 12, 2011 for PCT/US2010/050762.
U.S. Appl. No. 13/182,862, filed Jul. 14, 2011 entitled "System and Method for Deriving User Expertise Based on Data Propagating in a Network Environment," Inventor(s): Satish K. Gannu, et al.
Rosella Data Mining & Database Analytics, "Web Search and Web Navigation Pattern Analyzer," 3 pages; printed Jul. 25, 2011; http://222.roselladb.com/surf-pattern-analyzer.htm.
Grimes, Seth, "Sentiment Analysis: Opportunities and Challenges," Beye Network; Jan. 22, 2008; 6 pages, http://www.b-eye-network.com/view/6744.
Hess, Andreas, et al., "From Web 2.0 to Semantic Web: A Semi-Automated Approach," 15 pages; printed Sep. 30, 2009; http://www.andreas-hess.info/publications/hess-cisweb08.pdf.
Hess, Andreas, et al., "Multi-Value Classification of Very Short Texts," 8 pages, printed on May 12, 2010; http://www.andreas-hess.info/publicaitons/hess-ki08.pdf.
Horvitz, E., et al., "Coordinate: Probabilistic Forecasting of Presence and Availability,"2002, 10 pages, ftp://ftp.research.microsoft.com/pub/ejh/coordinate.pdf.
iLogos v1.5 download (win); 4 pages. [Retrieved and printed on May 28, 2010] from http://www.phil.cmu.edu/projects/argument_mapping/.
Oliveira, Bruno et al., "Automatic Tag Suggestion Based on Resource Contents," Knowledge Engineering: Practice and Patterns, Lecture Notes in Computer Science, 2008, vol. 5268/2008, DOI: 10.1007/978-3-54 [Abstract Only, 1 page]; http://www.springerlink.com/content/008w50405265r177/.
Ohl, Ricky, "Computer Supported Argument Visualisation: Modelling Wicked Problems," Ph.D. Thesis, Australian Digital Theses Program, Feb. 2008; 403 pgs.; http://gu.edu.au:8080/adt-root/public/adt-QGU20090724.155249/index.html.
U.S. Appl. No. 12/471,404, filed Sep. 30, 2009, entitled "System and Method for Generating Personal Vocabulary from Network Data," Inventor(s): Satish K. Gannu, et al.
U.S. Appl. No. 12/571,414, filed Sep. 30, 2009, entitled "System and Method for Providing Speech Recognition Using Personal Vocabulary in a Network Environment," Inventor(s): Satish K. Gannu, et al.
U.S. Appl. No. 12/571,421, filed Sep. 30, 2009, entitled "System and Method for Ensuring Privacy While Tagging Information in a Network Environment," Inventor(s): Satish K. Gannu, et al.
U.S. Appl. No. 12/571,426, filed Sep. 30, 2009, entitled "System and Method for Controlling an Exchange of Information in a Network Environment," Inventor(s): Satish K. Gannu, et al.
U.S. Appl. No. 12/762,194, filed Apr. 16, 2010, entitled "System and Method for Deducing Presence Status from Network Data," Inventor(s): Thangavelu Arumugam, et al.
U.S. Appl. No. 12/778,899, filed May 12, 2010, entitled "System and Method for Deriving User Expertise Based on Data Propagating in a Network Environment," Inventor(s): Virgil N. Mihailovici, et al.
U.S. Appl. No. 12/971,852, filed Dec. 17, 2010, entitled "System and Method for Providing Argument Maps Based on Activity in a Network Environment," Inventor(s) Deepti Patil et al.
U.S. Appl. No. 12/971,946, filed Dec. 17, 2010, entitled "System and Method for Providing Feeds Based on Activity in a Network Environment," Inventor(s) Satish K. Gannu et al.
U.S. Appl. No. 13/088,974, filed Apr. 18, 2011, entitled "System and Method for Providing Augmented Data in a Network Environment," Inventor(s) Satish K. Gannu et al.
U.S. Appl. No. 13/098,112, filed Apr. 29, 2011, entitled "System and Method for Evaluating Visual Worthiness of Video Data in a Network Environment," Inventor(s) Deepti Patil et al.
U.S. Appl. No. 13/098,434, filed Apr. 30, 2011, entitled "System and Method for Media Intelligent Recording in a Network Environment," Inventor(s) Ashutosh A. Malegaonkar et al.
Seher, Indra, "Query Expansion in Personal Queries," IADIAS (International Association for Development of the Information Society) 2006, 5 pages www.iadis.org/Multi2006/papers/16/5023_ISA.
Jiang, Weiliang, et al., "A Method for Personal Query Based on Role Preference Ontology," Industrial Mechanatronics and Automation, ICIMA 2009 International Conference, pp. 479-481; Abstract Only, 1 page.
"Click Scoring Relevance Framework," LucidWorks, 7 pages [retrieved and printed May 7, 2012] http://lucidworks.lucidimagination.com/display/lweug/Click+Scoring+Relevance+Framework.
"Google Custom Search," Web Page, Google.com, © 2012 Google, 1 page http://www.google.com/cse/.
"Recommender System," Wikipedia, Apr. 28, 2012; 9 pages http://en.wikipedia.org/wiki/Recommender_system.
"Understanding Metadata," NISO Press, National Information Standards Organization, 2004, 20 pages.
Bollen, et al., "Usage Derived Recommendations for a Video Digital Library," Journal of Network and Computer Applications, Academic Press, New York, NY, vol. 30, No. 3, Mar. 16, 2007.
Seher, Indra, ""Query Expansion in Personal Queries,"" IADIAS (International Association for Development of the Information Society) 2006, 5 pages www.iadis.org/Multi2006/papers/16/5023_ISA.
PCT Dec. 17, 2013 International Preliminary Report on Patentability from International Application Serial No. PCT/US2012/040097; 10 pages.
U.S. Appl. No. 13/608,787, filed Sep. 10, 2012 entitled "System and Method for Enhancing Metadata in a Video Processing Environment," Inventor(s) Sandipkumar V. Shah, et al.
Lancope, "Stealth Watch," Revolutionize the Way You View Your Network, © 2009, 8 pages; http://storage.pardot.com/2382/9637/StealthWatch_System_Family_Brochure.pdf.
Maybury, Mark et al., "Enterprise Expert and Knowledge Discovery," MITRE Technical Papers, The MITRE Corporation, Sep. 2000, 11 pages; http://www.mitre.org/work/tech_papers/tech_papers_00/maybury_enterprise/maybury_enterprise.pdf.
Montgomery, W. A., et al., "Network Intelligence for Presence Enhanced Communication," Spirits Working Group, May 2002, 9 pages, http://ietfreport.isoc.org/all-ids/draft-montgomery-copeland-presence-spirits-00.txt.
Moorthi, Y. L. R., "Have Breakfast or Be Breakfast," Wall Street Journal, Feb. 8, 2010, 2 pages; http://online.wsj.com/article/SB126465641868236415.html#printMode.
Nexidia, "Audio and Speech Analytics Software," 1 page; printed Sep. 30, 2009; http://www.nexidia.com.
Nortel Networks Wireless Solutions (A. Silver, J. Larkins, D. Stringer), "Unified Network Presence Management," A White Paper, © 2000, 6 pages, www.mobilein.com/UNPM.pdf.
NSA Watch, "Other Surveillance Network: Governmental Surveillance Agencies," 2 pages; printed Sep. 30, 2009; http://www.nsawatch.org/networks.html.
Sethy, Abhinav, et al., "Building Topic Specific Language Models from Webdata Using Competitive Models," 9$^{th}$ European Conference on Speech Communication and Technology, Eurospeech Interspeech

(56) References Cited

OTHER PUBLICATIONS

2005 International Speech and Communication Association Fr., 2005, pp. 1293-1296; XP 002614341; http://sail.usc.edu/publications/sethy-euro2005.pdf.
Swabey, Pete, "Making the Invisible Visible," 2 pages; Sep. 23, 2009; http://www.trampolinesystems.com/news/in+the+news/archive/2009/59.
Trampoline Systems, "Navigation," 2 pages; printed Sep. 30, 2009; www.trampolinesystems.com.
Trant, Jennifer, "Studying Social Tagging and Folksonomy: A Review and Framework," Jan. 2009, 10(1) Journal of Digital Information; 42 pages http://dlist.sir.arizona.edu/arizona/handle/10150/105375.
Virage, "Audio Analysis," Autonomy Virage, © 2009 Autonomy Virage, 1 page http://www.virage.com/security-and-surveillance/functions/audio-analysis/index.htm.
Virage, "Understanding Video," Autonomy Virage, © 2009 Autonomy Virage, 5 pages http://www.virage.com/rich-media/technology/understanding-video/index.htm.
Wang, Xuerui, et al., "Topics over Time: A NonMarkov Continuous Time Model of Topical Trends," KDD '06, Aug. 20-23, 2006, 10 pages.
Dang, et al., "Learning to Rank Query Reformulations," Proceedings of the 33rd Annual International ACM SIGIR Conference, SIGIR'10, Jul. 19-23, 2010, Geneva, Switzerland (2010); 2 pages.
EPO Nov. 7, 2012 Response to Communication pursuant to Rule 161(1) and 162 from European Application No. 10770664; 8 pages.
Filippova, et al., Improved Video Categorization from Text Metadata and User Comments, Proceedings of the 34th Annual International ACM SIGIR Conference, SIGIR'11, Jul. 24-28, 2011, Beijing, China (2011); 8 pages.
Gligorov, User-generated Metadata in Audio-visual Collections, Proceedings of the International World Wide Web Conference, WWW 2012, Apr. 16-20, 2012, Lyon, France (2012); 5 pages.
Harry, David, "The SEO Guide to Google Personalized Search," The Fire Horse Trail, SEO and Marketing Blog, Dec. 7, 2009, 9 pages http://www.huomah.com/Search-Engines/Search-Engine-Optimization/The-SEO-Guide-to-Google-Personalized-Search.html.
Jain, et al., "Learning to Re-Rank: Query-Dependent Image Re-Ranking Using Click Data," Proceedings of the International World Wide Web Conference, WWW 2011, Mar. 28-Apr. 1, 2011, Hyderabad, India (2011); 10 pages.
Li, Yingbo, et al., "Multi-Video Summarization Based on OB-MMR," EURECOM, Sophia Antipolis, France, Content-Based Multimedia Indexing (CBMI) 2011 9th International Workshop; 6 pages; http://www.eurecom.fr/fr/publication/3365/download/mm-publi-3365.pdf.
Masnick, Mike, "Creating an Automatic Highlight Reel for Sporting Events (Bleeding Edge)," Tech Dirt lite, Aug. 20, 2003, 2 pages http://www.techdirt.com/article_lite.php?sid=20030820/0042248&pid=17.
PCT Oct. 4, 2012 Notification of Transmittal of the International Search Report and Written Opinion of the International Search Authority from Application PCT/US2012/040097; 15 pages.
PCT Apr. 3, 2012 International Preliminary Report on Patentability and Wrtten Opinion of the International Searching Authority from International Application PCT/US2010/050762; 7 pages.
Rodriguez, et al. Automatic Metadata Generation Using Associative Networks, ACM Transactions on Information Systems, vol. 27, No. 2, Article 7, Feb. 2009.
Shao, Jian, et al., "Multi-Video Summarization Using Complex Graph Clustering and Mining," Computer Science and Information Systems, vol. 7, No. 1 (2010); 14 pages http://www.doiserbia.nb.rs/img/doi/1820-0214/2010/1820-021410010855.pdf.
Telestream, Inc. Product Literature, "Extracting and Preparing Metadata to Make Video Files Searchable," Telestream, Inc. 2008; 6 pages.
Tian, Ying-li, et al., "IBM Smart Surveillance System (S3): Event Based Video Surveillance System with an Open and Extensible Framework," Special Issue of Machine Vision and Applications Journal, 2008, vol. 19, Issue 5-6, 30 pages http://www.docstoc.com/docs/20141664/IBM-Smart-Surveillance-System-(S3)-Event-Based-Video-Surveillance.
Umbrich J., et al., "Four Heuristics to Guide Structured Content Crawling," Eighth International Conference on WEB Engineering, Jul. 14, 2008; © 2008 IEEE DOI 10.1109/ICWE.2008.42.
Wang, Feng, et al., "Multi-Document Video Summarization," ICME 2009, IEEE International Conference on Multimedia and Expo, 4 pages http://www.eurecom.fr/fr/publication/2751/download/mm-publi-2751.pdf.
WebChoir Products—Personal Vocabulary Tools, "Personal Tools," 1 page; printed Sep. 30, 2009; http://www.webchoir.com/products/ptt.html.
Wikipedia, "Homophone," 3 pages; printed Sep. 30, 2009; http://en.wikipedia.org/wiki/Homophone.
Wikipedia, "International Phonetic Alphabet," 19 pages; printed Sep. 30, 2009; http://en.wikipedia.org/wiki/International_Phonetic_Alphabet.
Wikipedia, "Phoneme," 7 pages; printed Sep. 30, 2009; http://en.wikipedia.org/wiki/Phoneme.
Yuen, L. et al., "Excalibur: A Personalized Meta Search Engine," Computer Software and Applications Conference 2004, COMPSAC 2004 Proceedings of the 28th Annual International, 2 pages.

\* cited by examiner

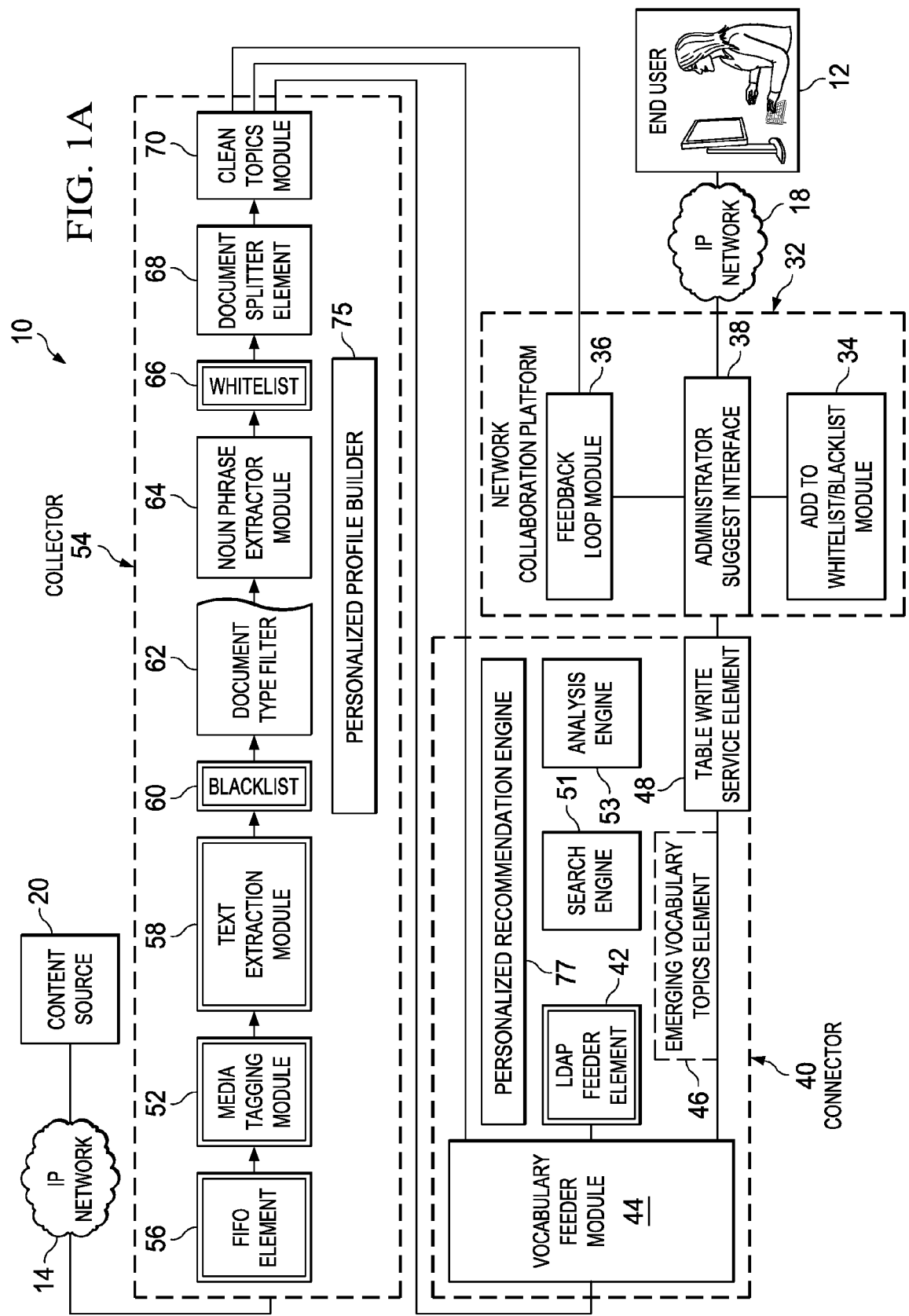

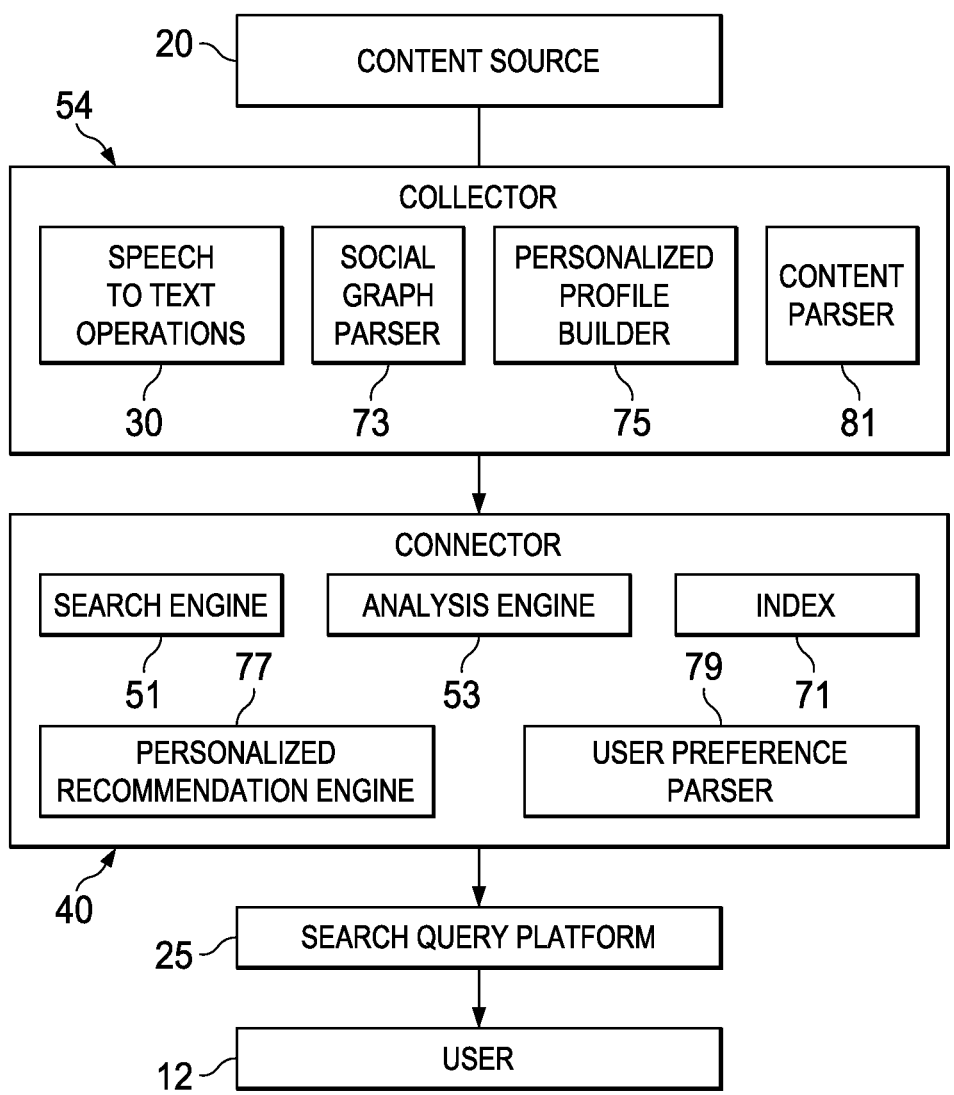

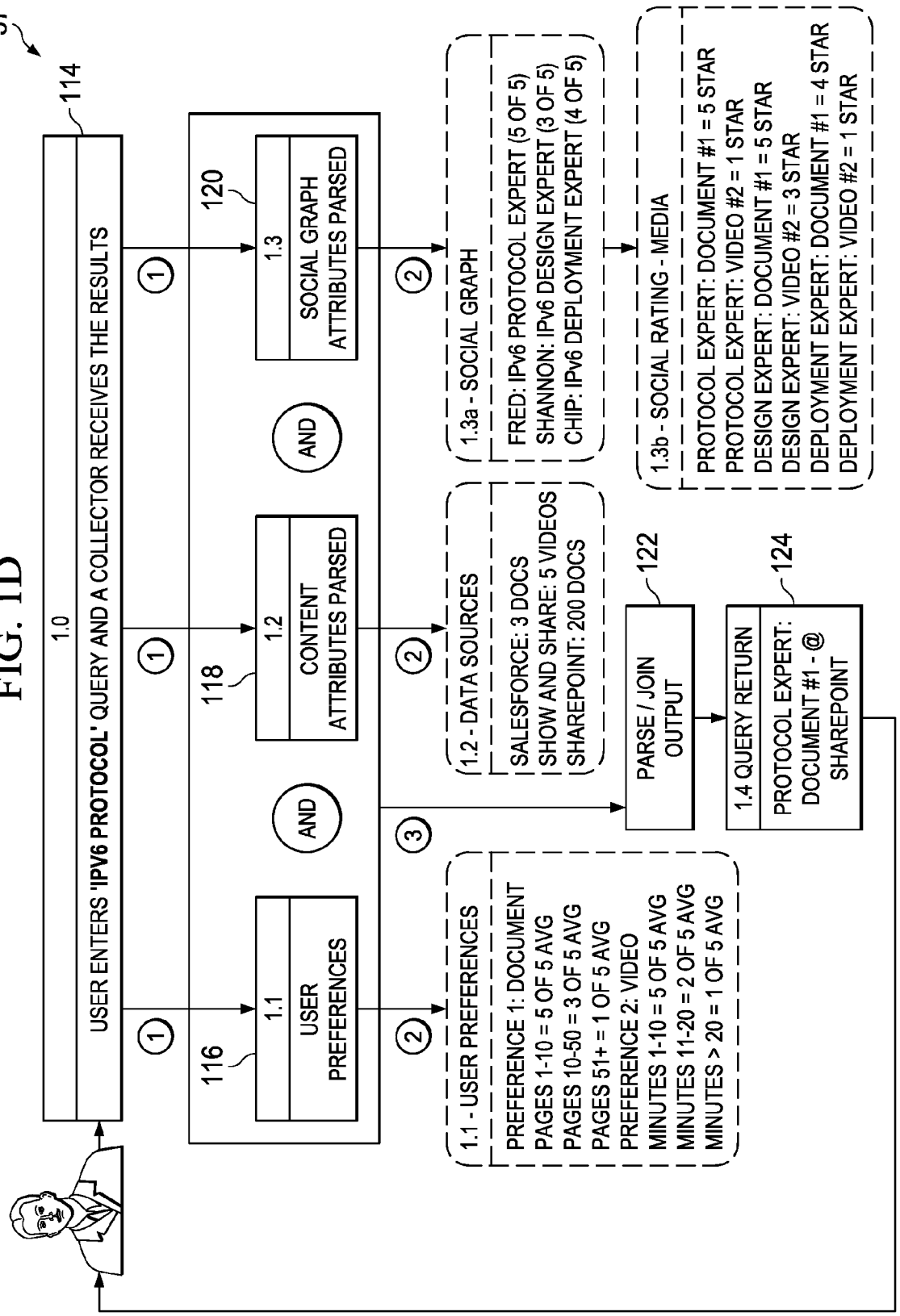

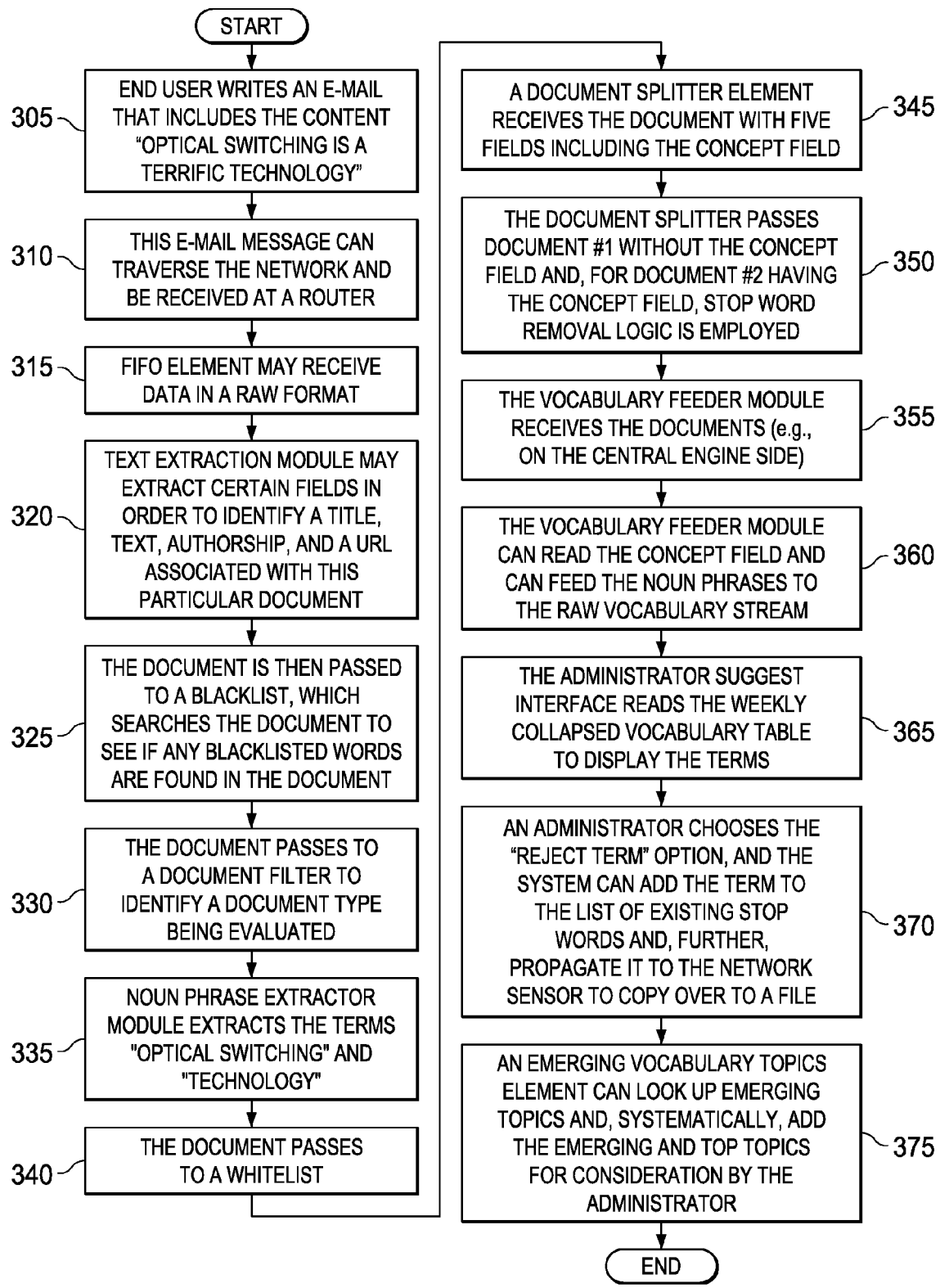

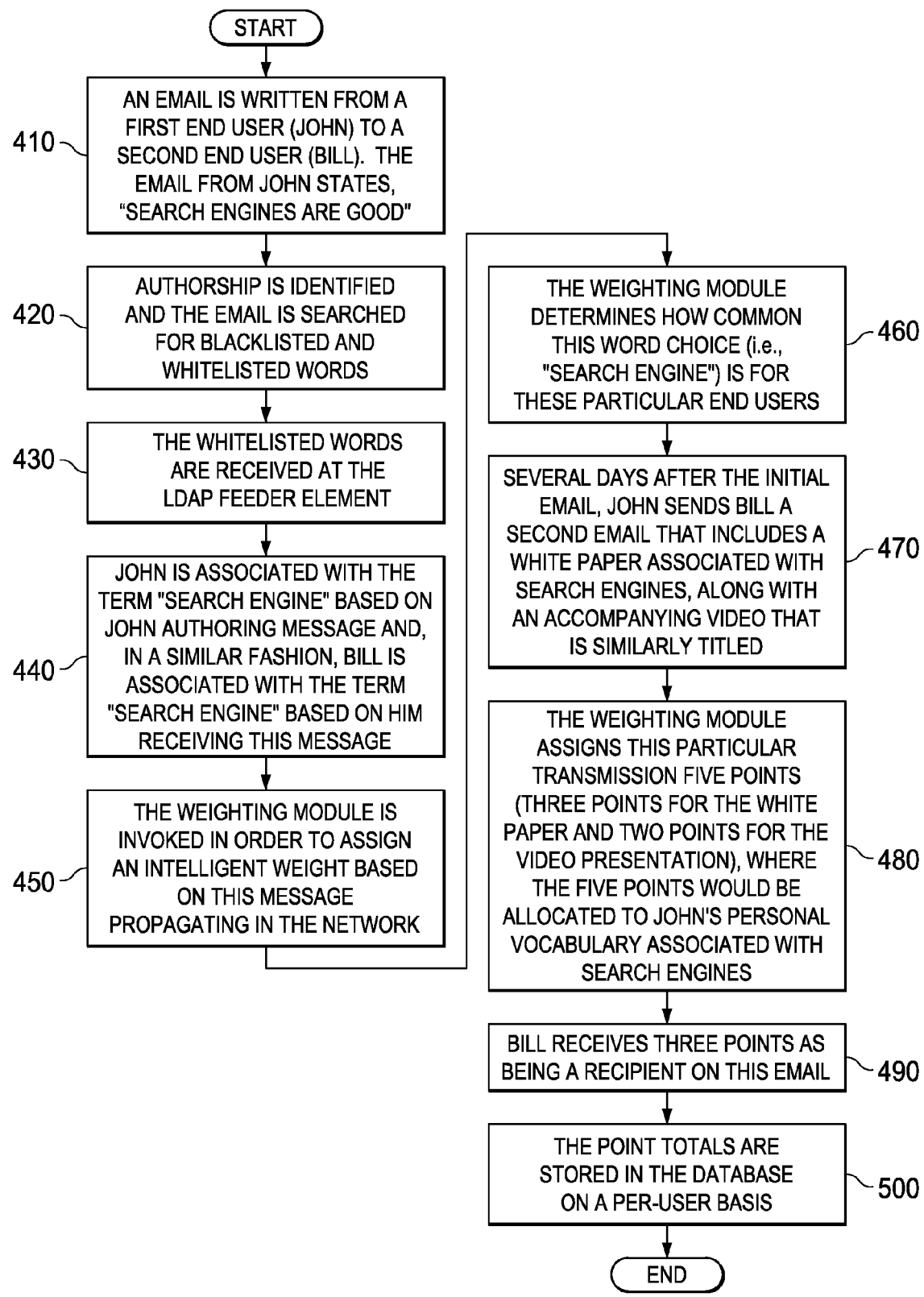

SYSTEM AND METHOD FOR EVALUATING RESULTS OF A SEARCH QUERY IN A NETWORK ENVIRONMENT

TECHNICAL FIELD

This disclosure relates in general to the field of communications and, more particularly, to evaluating results of a search query in a network environment.

BACKGROUND

The ability to effectively gather, associate, and organize information presents a significant obstacle: especially in the context of performing a search query. Typically, search query processing only takes into account the rankings of documents or objects in the index being queried. The ranking is based on simplistic measurements of an exact match of the document or object (such as a specific keyword), where blunt normalization techniques are employed (e.g., number of "hits" the document or object has received). Often, a search result will yield irrelevant results, or too many results that fail to match what a user was seeking. Hence, the ability to provide a viable search mechanism presents a significant challenge to system designers, software engineers, and network operators alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1A is a simplified block diagram of a communication system for evaluating results of a search query in a network environment in accordance with one embodiment;

FIG. 1B is a simplified block diagram illustrating one possible implementation associated with evaluating the results of a search query in accordance with one embodiment;

FIG. 1D is a simplified flow diagram that depicts evaluating the results of a search query, which can be performed in the communication system in accordance with one embodiment;

FIG. 3 is a simplified flowchart illustrating a series of example activities associated with the communication system; and FIG. 4 is a simplified flowchart illustrating another series of example activities associated with the communication system.

DETAILED DESCRIPTION OF EXAMPLE EMBODIMENTS

Overview

Figure 1C:
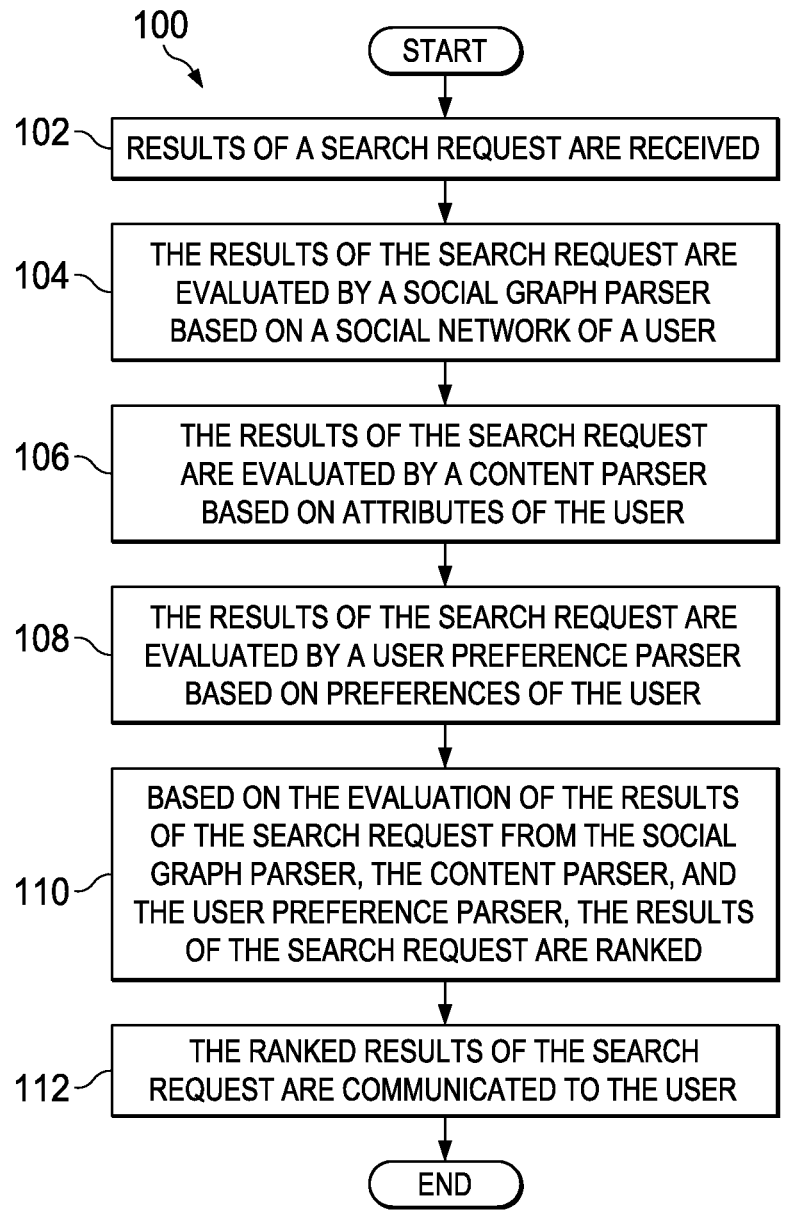
FIG. 1C is a simplified flowchart associated with one embodiment of the present disclosure.

A method is provided in one example and includes receiving results for a search query initiated by a user, and evaluating the results in relation to a personal profile of the user. The personal profile can include a plurality of characteristics associated with the user. The method also includes ranking the results based on the evaluation in order to generate a resultant (e.g., a list, a record, a file, directory, a graphic, a webpage, a uniform resource locator (URL) link, an object, etc.) that reflects a ranking of the results. The resultant can be communicated to the user. The resultant could be rendered on a user interface, delivered through e-mail, provided as raw data to a server, provided to a database, reformatted through a different interface, provided as a short message service (SMS) text data segment, etc.

The plurality of characteristics (which is inclusive of attributes) can include a media type preferred by the user; a derived expertise for the user; a social network of the user; a user name; an employer associated with the user; a tag cloud associated with the user; an age of the user; an information flow characteristic associated with the user; past queries associated with the user; and a rating of similar searches. In more specific implementations, at least one of the characteristics is weighted more than another characteristic from the plurality of characteristics.

In yet other embodiments, the method can include evaluating the results based on a social network of the user; evaluating the results based on attributes of the user; and evaluating the results based on preferences declared by the user. Additionally, in particular implementations, evaluating the results based on the social network can be done in parallel with evaluating the results based on the attributes, and in parallel with evaluating the results based on the preferences. In other example implementations, the personal profile of the user is created using a personal vocabulary database. The personal profile of the user is created using a personalized recommendation engine.

Example Embodiments

FIG. 1A is a simplified block diagram of a communication system 10 for providing search results to users operating in a network environment. FIG. 1A may include an end user 12, who is operating a computer device that is configured to interface with an Internet Protocol (IP) network 18. In addition, a content source 20 is provided, where content source 20 interfaces with the architecture through an IP network 14. Communication system 10 may further include a network collaboration platform (NCP) 32, which includes an add to whitelist/blacklist module 34, a feedback loop module 36, and an administrator suggest interface 38. FIG. 1A may also include a connector 40, which includes a lightweight directory access protocol (LDAP) feeder element 42, a vocabulary feeder module 44, an emerging vocabulary topics element 46, and a table write service element 48. Connector 40 may also include a search engine 51 and an analysis engine 53.

FIG. 1A may also include a collector 54 that includes a first in, first out (FIFO) element 56, a media tagging module 52, a text extraction module 58, a blacklist 60, a document type filter 62, a noun phrase extractor module 64, a whitelist 66, a document splitter element 68, and a clean topics module 70. Multiple collectors 54 may be provisioned at various places within the network, where such provisioning may be based on how much information is sought to be tagged, the capacity of various network elements, etc.

In accordance with certain embodiments, communication system 10 can be configured to filter results of a search query based on various characteristics (e.g., type of search result identification (document, video, slide show), content-type characteristics (e.g. level of expertise), origin of query result, any type of attribute, any type of digital signature, etc.). This information can be leveraged in order to suggest or inform the end user of the worthwhile search results that merit her attention. Such a filtering can increase productivity at work by reducing the number of search results that are irrelevant, as many employees typically perform several searches a day.

One aspect of the present disclosure can relate to providing a result ranking or rating in order to recommend individual search results based on characteristics specific to a user. The result rating mechanism empowers the user with information (beforehand) to make better time management decisions and to select search query results that may have the most meaningful to the user deserving of consideration. Without such intelligence, the user would be relegated to trial and error activities in a haphazard attempt to select search query results having significance. Note that the resultant ranking of the results can be provided in any suitable format (a list, a record, a file, directory, a graphic, a webpage, a uniform resource locator (URL) link, an object, etc.). Additionally, the resultant can be communicated to the user in any suitable fashion. For example, the resultant could be rendered on a user interface, delivered through e-mail, provided as raw data to a server, provided as raw data to a database, provided as an index, reformatted through a different interface, provided as a short message service (SMS) text data segment, provided in a proprietary coding, provided on a proprietary device, delivered to any suitable user device (e.g., a computer, a wireless device, etc.), etc. In a particular embodiment, the user is an end user.

Before turning to additional operational capabilities of communication system 10, certain foundational information is provided in order to elucidate some of the problematic areas associated with search query results. Current search query processing only takes into account the rankings of search results (e.g. documents/objects) in the index being queried. The ranking of the search results usually involves simplistic measurements of the exact match of the query (potentially accompanied by normalization techniques such as number of hits), and supplies only a simple view of the query string. Further, the search results are absent of any indicators that can be derived about the user or query initiator.

Consider an example in which an end user, who happens to be a self-declared expert at Internet Protocol version 6 (IPv6), submits a query for IPv6 into a search engine. The result of that query returns a multitude of items on the subject, but predominantly related to the basic functionality (or foundational knowledge) on the subject of IPv6. The query results were correct according to the search algorithm, as they exactly matched the query string supplied by the query initiator. However, the search results supplied in this manner were less than optimal, as they did not use any of the characteristics inherent to the end user. This leads to additional initiator queries, or attempts at different strategies for obtaining the desired information.

In contrast to these activities, communication system 10 is configured to apply different characteristics either provided by or gleaned from the end user to the normal search results. The combination of the end user characteristics (derived or declared) and the traditional search results are used to normalize (or enhance) the results of the query by leveraging the additional knowledge provided about the end user. This would tailor the resultant query, and force the recommendations to offer the most relevant query results.

In a particular embodiment, the characteristics can include (but are not limited to) preferred media types/learning styles (e.g. a preference to view documents or video, listen to audio, etc.), derived expertise, social network (colleagues, contacts, or friends), user name (of those in the social network or of the end user), employer/workgroup, tag cloud/trending topics (heat map), information flow (is the end user a hub or a spoke), end user's prior search history, systems' discovery of end user's profile and preferences, rating of similar searches provided by others with similar backgrounds, rating of similar content provided by the end user, and age, gender, or other personal information of the end user.

Consider an example in which an end user has a declared expertise of MPLS and, additionally, has been identified as a hub for MPLS related information. Further, additional information was gleaned by observing the end user's behavioral pattern, where it was observed over time that the end user has a preference for PowerPoint files instead of documents. As the search engine of the architecture of FIG. 1A is now aware of these additional characteristics (declared and derived), the search engine leverages these additional characteristics to enhance the query results. In this example scenario, a first pass of the search engine will still return the top rated hits, but these results would now be subjected to additional filters and queries based upon what is known via the characteristics. In this way, instead of the end user having to 'walk through' many pages of irrelevant results (basic concepts, etc.), the end user is presented with query results that are suited to her 'derived or observed behavioral' characteristics. For example, the query results could be returned that match document type preference (PowerPoint), documents at the appropriate expertise level (expert/hub), documents highly ranked by those in the end user's social network, and documents authored by individuals that were previously ranked high by the end user.

Hence, the process of the initial query result, combined with the additional characteristics declared and derived from the specific end user, offers the end user a customized search result. The results of the query offer a better contextual and semantic match to the intentions of the end user: instead of relying solely on an exact query string match. As more information is derived about the end user over time, the additional information can be used to provide even more specific content types (e.g. based upon specific authors) and, further, provide a mechanism to see which other content is recommended to others in which the end user has expressed an interest.

The end user's characteristics can be discovered by analyzing user behavior across all of the networks that the end user's has accessed: not just a single network platform. By analyzing the networks the end user's has accessed, a comprehensive personal profile of the end user (and characteristics unique to the end user) can be determined. This stands in contrast to harvesting characteristics specific to just one platform. This functionality could be used to construct a social graph/tag cloud functionality specific to searches that others derived within the end user's workgroup/company (or other affiliations), where such a construction can further enhance the results of the query initiator. In particular arrangements of the present disclosure, certain use cases may be supported by Mahout+ Latent Dirichlet Allocation (LDA) mechanisms.

Turning to FIG. 1B, this particular example includes end user 12, along with collector 54 and connector 40 of FIG. 1A. This particular example reflects a filtering mechanism associated with providing information to empower end user 12 to make intelligent decisions about which search results from a query should be viewed. FIG. 1B includes a content source 20 being coupled to collector 54, which includes social graph parser 73, a personalized profile builder 75, a speech to text operations element 30, and a content parser 81. Also illustrated in FIG. 1B is connector 40, which can include search engine 51, analysis engine 53, an index 71, a personalized recommendation engine 77, and a user preference parser 79.

Collector 54 and connector 40 are configured to filter, rank, and/or rate search query results from content source 20 to provide a customized search result set to a search query platform 25. Note that the terms 'rank' or 'rate' as used herein in this Specification are intended to include any type of scoring, evaluation, ranking, recommendation, designation, counting, tallying, or any other information that may be indicative of providing guidance to end user 12 about a search query result.

In operation, search query results can be systematically evaluated and tagged in order to rank the query results based on characteristics (inclusive of attributes) of end user 12. Further, this information can be fed into a framework (e.g., an algorithm within connector 40) to provide guidance (i.e., a rating) about the worthiness of each query result. Hence, the search query results are evaluated based on specific characteristics of end user 12. In a particular embodiment, personalized recommendation engine 77 uses personalized profile builder 75 to monitor traffic to (and from) end user 12 such that data streams can be evaluated to determine the characteristics of end user 12. For example, using personalized profile builder 75, high frequency words may be used to create characteristics of end user 12. The characteristics can then be used to intelligently evaluate each search result.

For example, social graph parser 73 is configured to evaluate each search result based on a social network of the end user. The social network can include frameworks such as Facebook, LinkedIn, MySpace, etc., or alternatively the social network can be organically created, or created in the context of a work/employee environment. The social network may include colleagues, professional contacts, co-workers, peers, or other individuals or entities (such as a company or a publication) that the end user knows or has developed a connection therewith. The social network may be created, for example, using names repeatedly identified by personalized profile builder 75. Content parser 81 is configured to evaluate each search result based on attributes of the end user. The attributes can include, the end user's gender, age, position (or level) at their place of employment, role at their place of employment, experience, or location. User preference parser 79 is configured to evaluate each search result based on the preferences of end user 12. The social network, attributes, and preferences of the end user may be specifically stated by the end user or derived based on the behavior of the end user. For example, end user 12 may specifically state that she prefers documents over videos or, because end user 12 typically selects a query result that is linked to a document instead of a video, connector 40 may determine that end user 12 prefers documents over videos.

In one example implementation, social graph parser 73, content parser 81, and user preference module 79 perform parallel processing and the results can be aggregated into (a common) index 71, which can be fed to search engine 51. Search engine 51 can be used to return appropriate results for end users (e.g., end user 12). Hence, after the results of the search query have been analyzed, analysis engine 53 can be used in order to determine the ranking or order of the results of the search query (e.g., where such operations may be performed at connector 40). Index 71 can contain data about the preferences and histories of end user 12 and in a particular embodiment contains a personal vocabulary for end user 12. The personal vocabulary development is discussed in detail below.

Logistically, multiple characteristics of end user 12 can contribute toward the formula of analyzing the results of the search query. In a particular embodiment, the characteristics of end user 12 may be weighted such that one characteristic is given more weight or consideration when rating the results of the search query. For example, the level of expertise of end user 12 may rank higher than a preference for video. This is one example of a formula or method to calculate the overall ranking of the query results. It should be understood that other formulas or methods could also be used to calculate the overall ranking of the query results. Other permutations are clearly within the broad scope of the tendered disclosure. Hence, one feature of communication system 10 is amenable to accommodating end user's 12 preferences such that end user 12 is less likely to select search request results that are not relevant to or not preferred by end user 12.

Turning to FIG. 1C, FIG. 1C is a simplified flowchart illustrating example activities associated with one feature of the present disclosure. In 102, the results of a search request are received. For example, collector 54 may receive the results of a search request initiated by end user 12. In 104, the results of the search request are evaluated by a social graph parser based on social network characteristics of a user. For example, social graph parser 73 may evaluate the results of the search request. In 106, the results of the search request are evaluated by a content parser based on attributes of the user. For example, content parser 81 may evaluate the results of the search request. In 108, the results of the search request are evaluated by a user preference parser based on preferences of the user. For example, user preference parser 79 may evaluate the results of the search request. In 110, based on the evaluation of the results of search request from the social graph parser, the content parser, and the user preference parser (or any suitable combination of these), the results of the search request are ranked. In 112, the ranked search results are communicated to the user.

Turning to FIG. 1D, FIG. 1D is a simplified flow diagram illustrating example activities associated with one feature of the present disclosure. At 114, a user enters the term "IPV6 Protocol" into a search engine and a collector receives the results of the search query. For example, collector 54 may receive the results of a search query. At 116, the results of the search query are evaluated based on the user's preferences. (The user prefers documents 1-10 pages in length and video that is 1-10 minutes.) For example, the user preference parser 79 may evaluate each search result based on the preferences of end user 12 to view documents 1-10 pages in length and video that is 1-10 minutes. At 118 the results of the search query are evaluated based on attributes of the user. (The user prefers data from a SharePoint site.) For example, the content parser 81 may evaluate each search result based on the preference of end user 12 to view data from the SharePoint site.

At 120, the results of the search query are evaluated based on a social network of the user. (In the user's social network are Fred, Shannon, and Chip and the user gives documents by Fred the highest rating.) For example, social graph parser 73 may evaluate each search result based on the preference of end user 12 to view documents from Fred. In a particular embodiment, the names of people in the user's social network are not used. Instead, job titles, skill level, or some other non-identifying label is used. For example, instead of using the name Fred, the title of Protocol Expert may be used.

At 122, the results of the evaluation of the search request from the social graph parser, the content parser, and the user preference parser are joined together (in any suitable fashion, which is configurable by the user, administrator, a default mechanism, etc.). A weighing factor may be applied such that one evaluation has a bigger influence than the other two. For example, the user's preference for documents from Fred may be the biggest factor on how the search results are presented to the user. At 124, the results of the search query are returned to the user and because the user prefers documents from Fred that are 1-10 pages long and from the SharePoint site, any documents that match that criteria are at the top of the search results. By evaluating the initial query results with declared and derived characteristics of end user 12, customized query results specifically for end user 12 can be created. The characteristics of end user 12 may be created or supplemented from a personal vocabulary list created for end user 12.

Turning to other inherent operational capabilities of communication system 10, the personal vocabulary can be built for end user 12 by gleaning the user's network traffic and by filtering keyword clusters. The personal vocabulary can be used to discover characteristics about end user 12. For example, the social network of end user 12 can be supplemented with names frequently found in the personal vocabulary. Analysis engine 53 can be configured to determine areas of interest for end user 12, as well as associations with other users.

In operation, communication system 10 has an inherent taxonomy, which lists business related terms, technologies, protocols, companies, hardware, software, industry specific terminology, etc. This set of terms and synonyms can be used as a reference to tag data seen by the system. End user's 12 network traffic (e.g., email, web traffic, etc.) can be tagged based on enterprise vocabulary. Hence, collector 54 is provisioned to scan received traffic (e.g., email, HTTP, etc.) from other users.

The topics of interest end user 12 can be determined by any suitable mechanism. For example, by building a personal vocabulary for end user 12. In general, the platform is constantly extracting keywords based on the traffic end user 12 is sending and receiving on the network, and associating these keywords to end user 12. Over a period of time, the platform develops a clear pattern of the most commonly used terms for end user 12. The system maps out end user's 12 top terms/phrases, which become part of end user's 12 personal vocabulary. For example, based on the user domain and the topics associated with outbound emails, or accessing documents over the web, end user 12 forms a personalized vocabulary that reflects the areas she is most likely to discuss over the enterprise network.

Subsequently, end user's 12 expertise may be calculated per term. End user's 12 personal vocabulary can be based on the number of occurrences a specific term is seen in the network (e.g., over a period of time). It can be independent of the other users in the system and, further, can be reflective of end user's 12 individual activity on those terms. The expertise metric may be more complex, and may be provided relative to the activity of the other users in the system, along with the recentness of the activity and the relevance to a specific term. While calculating the expertise for end user 12 for a specific business-related term, the system develops a list of relevant documents for that term, lists the authors of those documents, and ranks them based on relevancy scores. Any individual whose score is above a system-defined threshold, could join an expert set. Note that even though a user may be designated as being in the expert set, users of the expert set could still vary in their expertise level based on their scores.

In regard to accounting for user added tags (provided to their profiles), the platform offers automated tagging, personal vocabulary, and expertise derivation. It also allows end user 12 to manually add tags to her profile, as a way to account for any terms that the system may have inadvertently missed. In one particular example, the tags are restricted to the system's inherent master vocabulary. Based on the information the platform receives from the categories described above, end user's 12 topics of interest can be derived, where weights can be provided to the personal vocabulary, the expertise, and the profile tags. The weights can offer flexibility to tweak the importance of a certain characteristic based on the environment.

Note that for performing exact matches between users' personal vocabularies, once the platform derives end user's 12 personal vocabulary, it can use this information to find others in the system sharing similar personal vocabularies. For example, if John's personal vocabulary includes terms such as video, media processing, audio, and encoding, while Tim's personal vocabulary includes video, media processing, and audio, then John and Tim would share a match in their respective personal vocabularies. This information is useful because it identifies employees in the company who seem to be involved in similar areas.

In the case of sub-string matches between users' personal vocabularies, consider the same example involving John. While Kate's personal vocabulary includes terms such as video encoding, media engine, and audio files, the system can identify that John and Kate may not have an exact vocabulary match, but that they share a high number of sub-string matches (e.g., video-video encoding, encoding-video encoding, media processing-media engine).

For processing the categorical matches, if John consistently uses Facebook (where Facebook falls under the category equal to social networking in his personal vocabulary), while Smith uses Twitter (where Twitter also falls under the category equal to social networking in his personal vocabulary), then John and Smith have a categorical match.

For processing inter-categorical matches, where John is tagged for Facebook (category=social networking, related terms=communities, status updates) and Linda has been tagged for Integrated Workforce Experience (IWE) (category=product, related terms=communities, status updates) then John and Linda have an inter-categorical match for communities and status updates. This would effectively link Facebook activity to IWE activity in a meaningful way, and across users. In regards to deriving each user's network based relations, the platform is configured to tag email and web traffic. Based on the email interactions end user 12 has with other users on the system, the platform can generate a per-user relationship map. This allows the system to identify individuals with whom a person already communicates. Furthermore, this would allow for the identification of new individuals with whom there is no current relationship.

Using the inputs from above, end user's 12 social network can be derived by a function that incorporates the people from exact personal vocabulary matches, substring personal vocabulary matches, categorical matches, inter-categorical matches, and/or a user's network relationship. In terms of a logistical use case, consider an example where a given employee (John) has been actively working on a media-tagging product, which is an enterprise social networking and collaboration platform. Based on his activity from emails, web traffic, etc., the system derives his personal vocabulary, expertise, network relationships, etc. Additionally, the system determines John has a strong interest in video as a media form, and Facebook as an application.

Tim, Kate, Smith, and Linda have been identified as the people of interest to John based on the operational functions discussed above. Tim's connection was a result of exact personal vocabulary matches, Kate's connection was a result of sub-string matches, Smith's connection was a result of a categorical match, and Linda's connection (the farthest) was a result of an inter-categorical match. Based on the network relationships, the architecture can identify that John has an existing relationship with Tim (e.g., not only because of the email exchange, but because they also belong to the same group and because they report to the same manager). John and Kate do not belong to the same group, but have a strong email relationship with each other. Smith works in a social media marketing business unit, while Linda works in a voice technology group, as part of the IWE group: neither have ever communicated with John over email. Smith publishes a blog on an Intranet about harnessing social networking applications for the enterprise. Concurrently, John shares a presentation with a sales team associated with media tagging. Linda downloads papers associated with the concept of communities and status update virality to enhance the IWE product offering.

Turning to the infrastructure of FIG. 1A, IP networks 14 and 18 represent a series of points or nodes of interconnected communication paths for receiving and transmitting packets of information, which propagate through communication system 10. IP networks 14 and 18 offer a communicative interface between servers (and/or end users) and may be any local area network (LAN), a wireless LAN (WLAN), a metropolitan area network (MAN), a virtual LAN (VLAN), a virtual private network (VPN), a wide area network (WAN), or any other appropriate architecture or system that facilitates communications in a network environment. IP networks 14 and 18 can implement a TCP/IP communication language protocol in a particular embodiment of the present disclosure; however, IP networks 14 and 18 may alternatively implement any other suitable communication protocol for transmitting and receiving data packets within communication system 10.

Note that the elements of FIG. 1A-1B can readily be part of a server in certain embodiments of this architecture. In one example implementation, collector 54, connector 40, and/or NCP 32 are (or are part of) network elements that facilitate or otherwise helps coordinate the ranking of the query results operations, as explained herein. As used herein in this Specification, the term 'network element' is meant to encompass network appliances, servers, routers, switches, gateways, bridges, loadbalancers, firewalls, processors, modules, or any other suitable device, proprietary component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. Note that each of collector 54, connector 40, and/or NCP 32 can be provisioned with their own dedicated processors and memory elements (not shown), or alternatively the processors and memory elements may be shared by collector 54, connector 40, and NCP 32.

In one example implementation, connector 40 and/or collector 54 includes software (e.g., as part of search engine 51, analysis engine 53, social graph parser 73, personalized recommendation engine 77, etc.) to achieve the query ranking operations, as outlined herein in this document. In other embodiments, this feature may be provided externally to any of the aforementioned elements, or included in some other network device to achieve this intended functionality. Alternatively, several elements may include software (or reciprocating software) that can coordinate in order to achieve the operations, as outlined herein. In still other embodiments, any of the devices of FIG. 1A may include any suitable algorithms, hardware, software, components, modules, interfaces, or objects that facilitate the ranking of the query results operations. Additional operational capabilities of communication system 10 are detailed below.

Turning to the formulation of the personal vocabulary, communication system 10 can offer an intelligent filtering of words by leveraging the personal vocabulary of the individual who is associated with the collected data. The personal vocabulary can be developed in a different workflow, where the elimination of false positives represents an application of that personal vocabulary against an incoming media file. For example, as the system processes new end user media files (e.g., video, audio, any combination of audio/video, etc.), an additional layer of filtering can be performed that checks the collected (or tagged) terms against personal vocabulary. Thus, if a particular end user has a personal vocabulary that includes the term "meet", then as media files are identifying phonetically accurate words (e.g., "meet", "meat") in the audio track, the extraneous term (i.e., "meat") would be eliminated as being a false positive. Note that the probability of a personal vocabulary having two words that phonetically sound the same is low. This factor can be used in order to remove a number of false positives from information that is collected and sought to be tagged. This engenders a higher quality of phoneme-based speech recognition. Hence, the personal vocabulary can be used to increase the accuracy of terms tagged in media file scenarios.

In one general sense, an application can be written on top of the formation of an intelligent personal vocabulary database. A partitioned personal vocabulary database can be leveraged in order to further enhance accuracy associated with incoming media files (subject to tagging) to remove false positives that occur in the incoming data. Thus, the media tagging activity is making use of the personal vocabulary (which is systematically developed), to refine phoneme tagging.

The personal vocabulary developed by communication system 10 can be used to augment the characteristics of end user 12. Phoneme technology breaks down speech (for example, from analog to digital, voice segmenting, etc.) in order to provide text, which is based on the media file. For example, as a video file enters into the system, the objective is to capture relevant enterprise terms to be stored in some appropriate location. The repository that stores this resultant data can be searched for terms based on a search query. Phonetic based audio technology offers a mechanism that is amenable to audio mining activities. A phonetic-index can be created for every audio file that is to be mined. Searches can readily be performed on these phonetic indices, where the search terms could be free form.

In one example, end user 12 can upload a video file onto the system. Enterprise vocabulary can be tagged for this particular video file (e.g., using various audio-to-text operations). The resulting enterprise vocabulary can be confirmed based on end user's 12 personal vocabulary, which has already been amassed. For example, if an original tagging operation generated 100 tags for the uploaded video file, by applying the personal vocabulary check, the resulting tags may be reduced to 60 tags. These resulting 60 tags are more accurate, more significant, and reflect the removal of false positives from the collection of words. Additional details related to media tagging module 52 are provided below with reference to the FIGURES. Before turning to those details, some primary information is offered related to how the underlying personal vocabulary is constructed and developed.

Communication system 10 can intelligently harvest network data from a variety of end users, and automatically create personal vocabulary from business vocabulary by observing each user's interaction/traffic on the network. In a general sense, the architecture can isolate terms per person in order to define an end user's personal vocabulary. This information can subsequently be used to identify specific experts.

In other instances, the personal vocabulary can be used for topic-based social graph building (e.g., social networking applications). In other instances, this information can be used to improve the accuracy of speech-to-text translations, which can relate to the individual applications being used by the person, a particular environment in which the end user participates, feature invocation applications, etc. The solution can intelligently and dynamically auto generate different lists of personal vocabulary per user without creating additional overhead for the end users.

As part of its personal vocabulary development activities, communication system 10 can tag words for specific end users. For example, relevant words identified in an enterprise system can be extracted from the documents, which are flowing through the network. The tags can be categorized and then associated to the user, who generated or who consumed each document. In accordance with one example implementation, a tag can be given different weights depending on several potential document characteristics. One characteristic relates to the type of document propagating in the network (for example, email, an HTTP transaction, a PDF, a Word document, a text message, an instant message, etc.).

Another characteristic relates to the type of usage being exhibited by end user 12. For example, the system can evaluate if end user 12 represents the producer of the content (e.g., the sender, the poster, etc.), or the consumer of the content (e.g., the recipient, the audience member, etc.). In one example, if end user 12 were posting a document including the identified vocabulary, the act of posting such words would accord the words a higher weight, than merely receiving an email that includes the particular vocabulary words. Stated in different terms, in a forum in which end user 12 is authoring a document to be posted (e.g., on a blog, on a corporate website, in a corporate engineering forum, etc.), vocabulary words within that document would have a higher associative value than if the words were propagating in lesser forums (e.g., a passive recipient in an email forum). Yet another characteristic relates to a probability of a term showing up in a document. (Note that multiple word terms have a lower probability of occurrence and, therefore, carry a higher weight when they are identified). In one instance, the tagged vocabulary words can be aggregated using streaming databases, where the aggregated tags can be stored and archived in a summarized format.

The resulting information may be suitably categorized in any appropriate format. For example, a dynamic database (e.g., table, list, etc.) can be generated for each individual user, each user-to-user communication (e.g., 1-1, N or N, etc.), and each type of document (e.g., email, phone conversation messages, Meeting Place meeting data, WebEx data, blog posting, White Paper, PDF, Word document, video file, audio file, text message, etc.). Essentially, any type of information propagating in the network can be suitably categorized in the corresponding database of the tendered architecture. Some of the possible database configurations are described below with reference to the FIGURES.

It should be noted that there are several different types of objects flowing through the architecture of communication system 10. Components within communication system 10 can identify which objects should be processed by particular components of the configuration. One set of objects relates to media files. These can be received by FIFO element 56 and subsequently passed to media tagging module 52. The resultants (from processing, which occurs at media tagging module 52) is then passed to text extraction module 58.

In operation of an example that is illustrative of business vocabulary being developed, at vocabulary feeder module 44, data can be sent by noun phrase extractor module 64, (i.e., the content field) and this can be used for vocabulary suggestion for an administrator. This data can be anonymous, having no user concept. For LDAP feeder element 42, whitelisted terms are provided and, further, this can be used for personal vocabulary building, as discussed herein. In essence, this data belongs to a particular user; it is a document associated to a user. Thus, there are two distinct workflows occurring in the architecture, which processes different types of documents for different purposes.

For the business vocabulary workflow, one aspect of the architecture involves a noun phrase extraction component, which can be provided along with filtering mechanisms, and stream access counts to retrieve popular and/or new vocabulary terms. In one example implementation, involving the development of business vocabulary, the architecture can suggest words and phrases that are potential vocabulary candidates. Multi-word phrases can be given more weight than single word terms. The decision whether to include these words in the whitelist or the blacklist can rest with the vocabulary administrator. The administrator can also decide if the words should never be brought to his attention again by marking them for addition to the list of administrator stop words. This can take the form of a feedback loop, for example, from the NCP user interface to the collector/connector (depending on where the stop word removal component may reside).

In one example embodiment, only a certain domain of data (e.g., words) of vocabulary is tagged. As used herein in this Specification, the term 'data' is meant to encompass any information (video, text, audio, multimedia, voice, etc.) in any suitable format that propagates in a network environment. The particular domain could be provided in a whitelist, which reflects specific network content. In one example implementation, an administrator can develop a certain domain that respects privacy issues, privileged content, etc. such that the ultimate composite of documents or files would reflect information capable of being shared amongst employees in a corporate (potentially public) environment. In certain implementations, the resultant composite of documents (i.e., data) can help to identify experts associated with specific subject matter areas; however, there are a myriad of additional uses to which communication system 10 can apply. As used herein in this Specification, the term 'resultant composite' can be any object, location, database, repository, server, file, table, etc. that can offer an administrator the results generated by communication system 10.

Figure 1E:
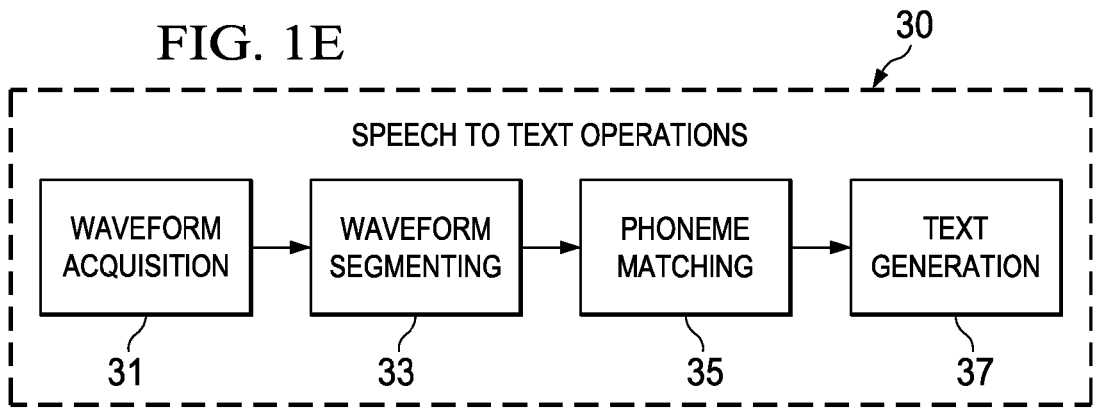
FIG. 1E is a simplified schematic diagram of speech-to-text operations that can be performed in the communication system in accordance with one embodiment.

Turning to FIG. 1E, FIG. 1E is a simplified schematic diagram illustrating a number of speech-to-text operations 30 that may occur within communication system 10. In one implementation, the speech-to-text operations are part of text extraction module 58. The speech-to-text conversion can include a number of stages. For example, the waveform acquisition can sample the analog audio waveform. The waveform segmentation can break the waveform into individual phonemes (e.g., eliminating laughter, coughing, various background noises, etc.). Phoneme matching can assign a symbolic representation to the phoneme waveform (e.g., using some type of phonetic alphabet). In addition, the text generation can map phonemes to their intended textual representation (e.g., using the term "meet" or "meat"). If more than one mapping is possible (as in this example), a contextual analysis can be used to choose the most likely version.

In operation, media tagging module 52 can be configured to receive a media file (video, audio, etc.) and transform that information into a text tagged file, which is further passed to a document indexing function. More specifically, and in one example implementation, there is a separate workflow that occurs before text extraction activities are performed. This separate workflow can address media files, which may undergo some type of conversion from audio to text. For example, if a video file were to be received, audio information would be identified and, subsequently, converted to text information to identify relevant enterprise vocabulary. An audio stream can be converted to a phonetic index file (i.e., a phonetic audio track). Once the phonetic index file is created, an enterprise vocabulary can be applied to search for enterprise terms within this phonetic index file. In one instance, the enterprise vocabulary may include one or more whitelist words, which can be developed or otherwise configured (e.g., by an administrator).

Applying the enterprise vocabulary can include, for example, taking each word within the enterprise vocabulary and searching for those particular words (e.g., individually) in the audio track. For example, for an enterprise vocabulary of 1000 words, a series of application program interfaces (APIs) can be used to identify that a given word ("meet") is found at specific time intervals (T=3 seconds, T=14 seconds, T=49 seconds, etc.). The resultant could be provided as a list of 40 words (in this particular example).

This list can be checked against a personal vocabulary database, which is particular to the end user who is seeking to send, receive, upload, etc. this media file. Thus, the personal vocabulary (e.g., having 250 words) can be loaded and leveraged in order to eliminate false positives within the 40 words. This could further reduce the resultant list to 25 words. A resulting text file can be fed to text extraction module 58 for additional processing, as outlined herein.

Figure 1F:
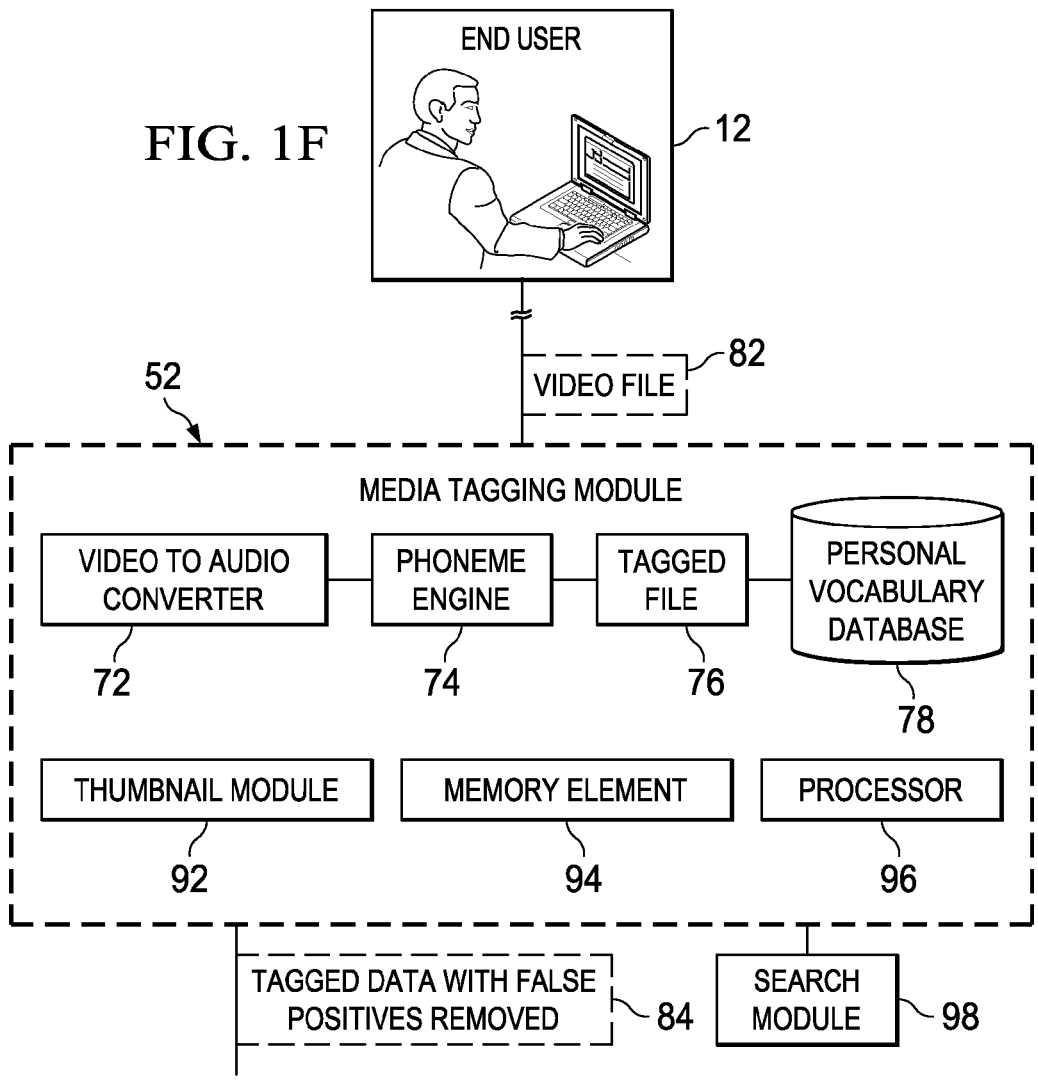
FIG. 1F is a simplified block diagram of a media tagging module in the communication system in accordance with one embodiment.

FIG. 1F is a simplified block diagram that illustrates additional details relating to an example implementation of media tagging module 52. Media tagging module 52 may include a video-to-audio converter 72, a phoneme engine 74, a tagged file 76, a thumbnail module 92, a memory element 94, a processor 96, and a personal vocabulary database 78. A raw video file 82 can be sought to be uploaded by end user 12, and it can propagate through media tagging module 52 in order to generate tagged data with false positives removed 84. Additionally, a search module 98 is also provided in FIG. 1F and this element can interact with media tagging module 52 in order to search information that has already been intelligently filtered using the various mechanisms outlined herein. For example, a search interface could be provided (to a given end user) and the interface could be configured to initiate a search for particular subject areas within a given database. The removal of false positives can occur at an indexing time such that when an end user provides a new search to the system, the database is more accurate and, therefore, a better search result is retrieved.

In the context of one example flow, media can be extracted from HTTP streams, where it is subsequently converted to audio information. The audio track can be phonetic audio track (PAT) indexed. Appropriate tags can be generated and indexed, where thumbnails are transported and saved. Queries can be then served to the resulting database of entries (e.g., displayed as thumbnails), where relevant video and audio files can be searched. Duplicate video entries can be removed, modified, edited, etc. on a periodic basis (e.g., by an administrator, or by some other individual). In addition, the appropriate video or audio player can offer a suitable index (e.g., provided as a "jump-to" feature) that accompanies the media.

Speech recognition can be employed in various media contexts (e.g., video files, Telepresence conferences, phone voicemails, dictation, etc.). In addition, any number of formats can be supported by communication system 10 such as flash video (FLV), MPEG, MP4, MP3, WMV, audio video interleaved (AVI), MOV, QuickTime (QT) VCD, MP4, DVD, etc. Thumbnail module 92 can store one or more thumbnails on a platform that connects individual end users. The platform could be (for example) used in the context of searching for particular types of information collected by the system.

Figure 2:
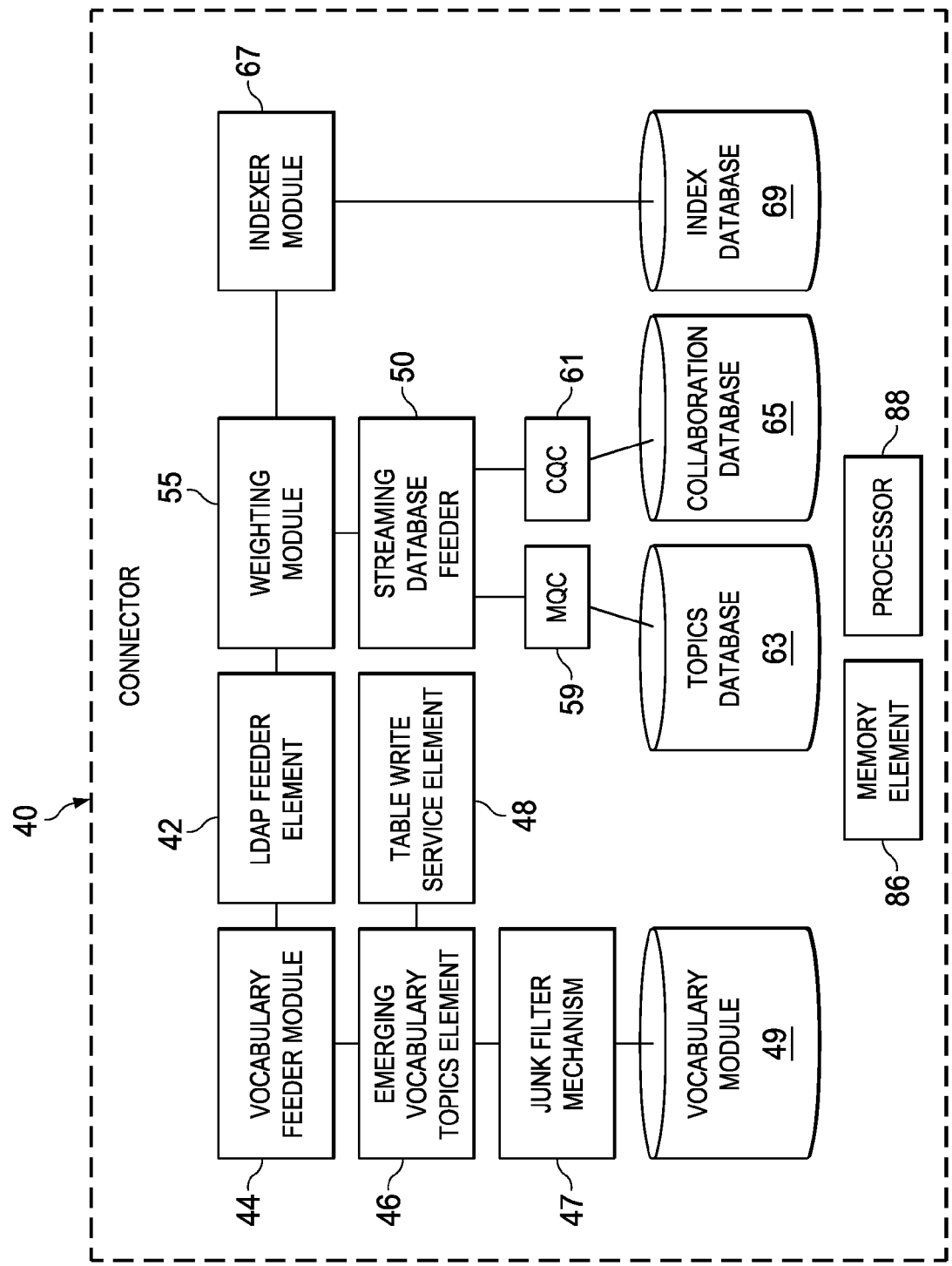
FIG. 2 is a simplified block diagram of a connector in the communication system in accordance with one embodiment.

Turning to technical details related to how the personal vocabulary is developed, FIG. 2 is a simplified block diagram of an example implementation of connector 40. Connector 40 includes a memory element 86 and a processor 88 in this particular configuration. Connector 40 also includes a junk filter mechanism 47 (which may be tasked with removing erroneous vocabulary items), a vocabulary module 49, a weighting module 55, a streaming database feeder 50, a MQC 59, a CQC 61, a topics database 63, a collaboration database 65, an indexer module 67, and an index database 69. Indexer module 67 is configured to assist in categorizing the words (and/or noun phrases) collected in communication system 10. Those indices can be stored in index database 69, which can be searched by a given administrator or an end user. Along similar reasoning, topics database 63 can store words associated with particular topics identified within the personal vocabulary. Collaboration database 65 can involve multiple end users (e.g., along with an administrator) in formulating or refining the aggregated personal vocabulary words and/or noun phrases. In regards to vocabulary module 49, this storage area can store the resultant composite of vocabulary words (e.g., per individual), or such information can be stored in any of the other databases depicted in FIG. 2. It is imperative to note that this example of FIG. 2 is merely representing one of many possible configurations that connector 40 could have. Other permutations are clearly within the broad scope of the tendered disclosure.

In operation of a simplified example used for discussion purposes, the extraction and processing operations can be performed on collector 54, where those results may be provided to connector 40 for building personal vocabulary. With respect to the initial text stripping operations, noun phrase extractor module 64 can find the noun phrases in any text field. In more specific implementations, pronouns and single words are excluded from being noun phrases. A noun phrase can be part of a sentence that refers to a person, a place, or a thing. In most sentences, the subject and the object (if there is one) are noun phrases. Minimally, a noun phrase can consist of a noun (e.g., "water" or "pets") or a pronoun (e.g., "we" or "you"). Longer noun phrases can also contain determiners (e.g., "every dog"), adjectives (e.g., "green apples") or other preceding, adjectival nouns (e.g., "computer monitor repair manual"), and other kinds of words, as well. They are called noun phrases because the headword (i.e., the word that the rest of the phrase, if any, modifies) is a noun or a pronoun. For search and other language applications, noun phrase extraction is useful because much of the interesting information in text is carried by noun phrases. In addition, most search queries are noun phrases. Thus, knowing the location of the noun phrases within documents and, further, extracting them can be an important step for tagging applications.

For the end user interface, periodically, terms can be suggested to the administrator for adding to the vocabulary. The existing interface for user-suggested vocabulary could be used for displaying the terms to the administrator. In one example implementation, a stop word removal feature can be provided on connector 40 (e.g., this could make implementation of the feedback loop more efficient). In other instances, the stop word removal feature is placed on collector 54 so that only the filtered fields are sent over to connector 40. The concept field can be accessible like other fields in the received/collected documents. The concept field is a list of string field values. Additional functionalities associated with these operations are best understood in the context of several examples provided below.

While this is occurring, in a separate workflow personal vocabulary can be developed. Thus, communication system 10 can generate personal vocabulary using corporate vocabulary, which is propagating in the network. In practical terms, it is difficult to tag user traffic in a corporate (i.e., enterprise) environment. There are two modes in which corporate vocabulary can be generated. First, in a learning mode, where end users are not yet subscribed, automatic corporate vocabulary can be generated by tagging content as it flows through the network. This can be generated by tagging content anonymously in the network. This typically happens in the learning mode of the system, where no users are subscribed on the system. The user whose content is being tagged is not necessarily of interest at the time of corporate vocabulary generation. Second, in a real-time system scenario, as users begin using the system, users have the ability to suggest new words to the corporate vocabulary through a manual process, feedback loops, etc., which are detailed herein.

By contrast, personal vocabulary generation can use corporate vocabulary to tag words for particular users. As documents (e.g., email/http/videos, PDF, etc.) flow through the network, the system checks for words from the corporate vocabulary, tags the appropriate words (e.g., using a whitelist), and then associates those words with particular users. Communication system 10 can include a set of rules and a set of algorithms that decide whether tagged words should be added to a personal vocabulary. Rules include common term threshold, group vocabulary adjustment, etc. Over a period, the user's personal vocabulary develops into a viable representation of subject areas (e.g. categories) for this particular end user. In addition, the user has the ability to add words to his personal vocabulary manually. He also has the ability to mark individual words as public or private, where the latter would prohibit other users in the system from viewing those personal vocabulary words.

Many of these activities can be accomplished by using streaming databases in accordance with one example implementation. In one particular instance, this involves the use of streaming database feeder 50. A streaming database continuously analyzes massive volumes of dynamic information. Streaming database feeder 50 can create a user sub-stream for each user, where the tags could continuously be updated for that user. By writing a simple query, an individual can derive the most prevalent topics (e.g., based on a normalized count and time).

FIGS. 3 and 4 offer two distinct workflows for communication system 10. FIG. 3 addresses the corporate vocabulary formation, whereas FIG. 3 addresses the personal vocabulary development. It should also be noted that these illustrations are associated with more typical flows involving simplistic documents propagating in a network (e.g., email, word processing documents, PDFs, etc.).

FIG. 3 is a simplified flowchart illustrating one example operation associated with communication system 10. In this particular flow, at step 305, end user 12 has written an email that includes the content "Optical Switching is a terrific technology." This email message can traverse the network and be received at a router (e.g., a large corporate router, a switch, a switched port analyzer (SPAN) port, or some type of virtual private network (VPN) network appliance). This is reflected by step 310. Collector 54 can be provisioned at such a location in order to capture data and/or facilitate the identification of content, as described herein.

In this particular example, FIFO element 56 may receive data in a raw format at step 315. Text extraction module 58 may extract certain fields in order to identify a title, text, authorship, and a uniform resource locator (URL) associated with this particular document at step 320. [Note that as used herein in this Specification, the term 'separate' is used to encompass extraction, division, logical splitting, etc. of data segments in a data flow. The term 'tag' as used herein in this Specification, is used to encompass any type of labeling, maintaining, identifying, etc. associated with data.] Note that for this particular instance (where an email is being sent), the URL can have a blank field.

The title may include a subject line, or an importance/priority parameter, and the text field would have the quoted statement (i.e., content), as written above. The document is then passed to blacklist 60, which searches (i.e., evaluates) the document to see if any blacklisted words are found in the document (step 325). If any such blacklisted words are present, the document is dropped. In one general sense, there are two layers of privacy provided by blacklist 60 and whitelist 66, which are working together. Examples of blacklist words in a corporate environment may include 'salary', 'merger', etc., or possibly words that might offend public users, compromise privacy issues, implicate confidential business transactions, etc. Note that the blacklist (much like the whitelist) can readily be configured by an administrator based on particular user needs. The term 'whitelist' as used herein in this Specification is meant to connote any data sought to be targeted for inclusion into the resultant composite of words for an administrator. Along similar reasoning, the term 'blacklist' as used herein is meant to include items that should not be included in the resultant composite of words.

Provided that the document in this instance is not dropped as a result of the blacklist check, the document passes to document filter 62. Document filter 62 performs a quick check of the type of document that is being evaluated at step 330. Again, this component is configurable as an administrator can readily identify certain types of documents as including more substantive or meaningful information (e.g., PDF or Word processing documents, etc.). Along similar reasoning, some documents (such as JPEG pictures) may not offer a likelihood of finding substantive vocabulary (i.e., content) within the associated document. These more irrelevant documents may be (as a matter of practice) not evaluated for content and any such decision as to whether to ignore these documents (e.g., JPEG pictures), or scrutinize them more carefully would be left up to an administrator.

In one example, noun phrase extractor module 64 includes a natural language processing (NLP) component to assist it in its operations. Note that a similar technology may exist in text extraction module 58 to assist it in its respective operations. One objective of noun phrase extractor module 64 is to extract meaningful objects from within text such that the content can be aggregated and further processed by communication system 10. In this example, noun phrase extractor module 64 performs its job by extracting the terms "optical switching" and "technology." This is illustrated by step 335.

Once this document has propagated through noun phrase extractor module 64, the document passes to whitelist 66 at step 340. An administrator may wish to pick up certain whitelisted words in the content, as it propagates through a network. The whitelist can be used on various fields within communication system 10. In this particular example, the whitelist is used to search the title and text fields. At this point, the document is sent to document splitter element 68. Note that there are two documents being created from the original document. In one instance, document splitter element 68 can receive a document with five fields including the concept field (at step 345), and perform several operations. First, it creates document #2 using the concept field in document #1. Second, it removes the concept field from document #1. Third, it can remove all fields except the concept field from document #2. Fourth, it can send both document #1 and document #2 to clean topics module 70.

It should be noted that noun phrase extractor module 64 operates best when considering formal statements (e.g., using proper English). Colloquialisms or folksy speech is difficult to interpret from the perspective of any computer system. More informal documentation (e.g., email) can be more problematic, because of the speech that dominates this forum.

Clean topics module 70 is configured to address some of these speech/grammar issues in several ways. In one example implementation, clean topics module 70 can receive two documents, as explained above. It passes document #1 without the concept field. For document #2, having the concept field, it can be configured to employ stop word removal logic at step 350. In this particular arrangement, the following stop words can be removed: first name, last name, userid; functional stop word: A, an, the, etc.; email stop words: regards, thanks, dear, hi, etc.; non-alphabets: special characters, numbers; whitelist words: words found in a whitelist file configured by the administrator; administrator stop words: administrator rejected system words. Note that the operation of filtering functional stop words is different from filtering email (e.g., administrator stop words). For example, "Back Of America" would not be processed into "Bank America." Thus, stop words between two non-stop words would not necessarily be removed in certain instances.

In addition, and in this particular example, the following rules can be applied: Rule 1: Remove the entire noun phrase if a substring match is found; Rule 2: Remove only the offending culprit; Rule 3: Remove the entire noun phrase if an exact match is found. Particular to this example, rules can be applied in the following order: Drop concept fields containing non-alphabets (Rule 1); Drop concept fields containing (e.g., LDAP) entries (Rule 1); Drop concept fields containing email stop words (Rule 1); Remove the functional stop word only if it is at either end of the concept field. Do not drop the words found in between, apply rule iteratively (Rule 2). Drop the concept field value if it is an exact match with the whitelist words (Rule 1). Drop the concept field value if it is an exact match with the administrator stop words (Rule 1). Note that LDAP filtering can also occur during these activities. For example, if any proper names already in LDAP are identified, the filter can just drop those terms.

Vocabulary feeder module 44 can receive the documents (e.g., on the connector side) at step 355. Vocabulary feeder module 44 forwards the document without the concept field and, for the document with the concept field, it sends it to streaming database feeder 50. In one instance, the streams are associated with storage technology, which is based on a stream protocol (in contrast to a table format). In other instances, any other suitable technology can be employed to organize or to help process the incoming documents, content, etc. The streams can be updated by vocabulary feeder module 44.

More specifically, the analytics approach of connector 40 (in one example) involves having queries analyze streaming data. This strategy for handling continuously flowing data is different from traditional business intelligence approaches of first accumulating data and then running batch queries for reporting and analysis. Such an approach enables analysis of heterogeneous data regardless of whether the data is flowing, staged, etc. In addition, queries are continuous and constantly running so new results are delivered when the downstream application can use them. Data does not need to be stored or modified, so the system can keep up with enormous data volumes. Thousands of concurrent queries can be run continuously and simultaneously on a server architecture. Queries can be run over both real-time and historical data. Incoming data can be optionally persisted for replay, back-testing, drill-down, benchmarking, etc.

Returning to the flow of FIG. 3, vocabulary feeder module 44 can read the concept field (e.g., created by the NLP module) and can feed the noun phrases to the raw vocabulary stream (e.g., "raw_vocab_stream" file) at step 360. The vocabulary feeder mechanism can calculate the weight of each of the topics in the concept field by looking up a hash map (initialized from a file) between the number of terms and corresponding weight and, subsequently, feed the topic, calculated weight, and timestamp into the raw vocabulary stream. The vocabulary feeder's output can be configured to interface with the vocabulary stream. The streams aggregate the topics into (for example) a weekly collapsed vocabulary table (e.g., "weekly_collapsed_vocab_table" file), which could be updated during any suitable timeframe (e.g., hourly). This table serves as input to table write service element 48.

In regards to the periodic write service, a periodic service can invoke the write to administrator table service, as explained above. This service can be configurable for the following: silent mode, hourly, daily, weekly, monthly. Hourly, daily, weekly, and monthly modes designate that the terms are suggested to an administrator on the specified intervals. Hourly intervals could be used for testing purposes. A silent mode offers a file based approach, where terms are written to a file, and do not make it to the administrator user interface.

For table write service element 48, a service layer can read the weekly collapsed vocabulary table for the top words and write to the administrator user interface table. The administrator user interface table can represent the shared table between user-suggested vocabulary terms and the system suggested vocabulary terms. Administrator suggest interface 38 can read the user-suggested vocabulary table ("userSuggestedVocabulary table") to display the terms. This module can suggest the top 'n' words to the administrator for adding to the vocabulary whitelist. Feedback loop module 36 may include application program interfaces (APIs) being provided to create a file from the table of suggested vocabulary terms.

In this example, administrator suggest interface 38 reads the weekly collapsed vocabulary table to display the terms at step 365. This element also suggests the top (e.g., 'n') words to an administrator for addition to the vocabulary whitelist. The administrator is provided a user interface to make decisions as to whether to add the term to the whitelist, add it to the blacklist, or to ignore the terms. In one example implementation, the administrator does not suggest new stop words. Only system suggested (or user suggested) stop words can be rejected.

Feedback loop module 36 is coupled to administrator suggest interface 38. In case the administrator chooses the "reject term" option, the system can add the term to the list of existing stop words and, further, propagate it to collector 54 to copy over to a file (e.g., adminStopWords.txt). This is reflected by step 370. Network collaboration platform 32 can create a file from the table suggested vocabulary terms (e.g., via commands including suggestedby=system, and status=rejected). This file can be a part of the force sync files that can be pushed to the collector/connector (depending on where the stop words mechanism resides). At step 375, emerging vocabulary topics element 46 can look up emerging topics (e.g., within harvested documents) and, systematically, add the emerging and top topics to the architecture for the administrator to consider. Both options can be provided to an administrator. The emerging topics can be similar to the experience tags such that topics growing in prominence over a given time interval (e.g., a week) can be suggested to an administrator.

FIG. 4 is a simplified flowchart illustrating one example operation associated with communication system 10. In this particular flow, an email is written from a first end user (John) to a second end user (Bill) at step 410. The email from John states, "Search engines are good" and this is evaluated in the following ways. First, authorship is identified and the email is searched for blacklisted and whitelisted words at step 420. In essence, a number of text stripping operations occur for the received document (as outlined previously above in FIG. 3). Second, the whitelisted words are received at LDAP feeder element 42 at step 430. In one sense, the appropriate concept has been extracted from this email, where insignificant words have been effectively stripped from the message and are not considered further.

At step 440, John is associated with the term "search engine" based on John authoring message and, in a similar fashion, Bill is associated with the term "search engine" based on him receiving this message. Note that there is a different weight associated with John authoring this message, and Bill simply receiving it. At step 450, weighting module 55 can be invoked in order to assign an intelligent weight based on this message propagating in the network. For example, as the author, John may receive a full point of weight associated with this particular subject matter (i.e., search engines). As the recipient, Bill may only receive a half point for this particular subject matter relationship (where Bill's personal vocabulary would include this term, but it would not carry the same weight as this term being provided in John's personal vocabulary).

In addition, and as reflected by step 460, weighting module 55 may determine how common this word choice (i.e., "search engine") is for these particular end users. For example, if this were the first time that John has written of search engines, it would be inappropriate to necessarily tag this information and, subsequently, identify John as an expert in the area of search engines. This email could be random, arbitrary, a mistake, or simply a rare occurrence. However, if over a period, this terminology relating to search engines becomes more prominent (e.g., reaches a threshold), then John's personal vocabulary may be populated with this term.

In this particular example, several days after the initial email, John sends Bill a second email that includes a white paper associated with search engines, along with an accompanying video that is similarly titled. This is reflected by step 470. Connector 40 has the intelligence to understand that a higher weight should be accorded to this subsequent transmission. Intuitively, the system can understand that certain formats (White Papers, video presentations, etc.) are more meaningful in terms of associating captured words with particular subject areas. At step 480, weighting module 55 assigns this particular transmission five points (three points for the White Paper and two points for the video presentation), where the five points would be allocated to John's personal vocabulary associated with search engines. In addition, Bill is also implicated by this exchange, where he would receive a lesser point total for (passively) receiving this information. In this instance, and at step 490, Bill receives three points as being a recipient on this email. At step 500, the point totals are stored in an appropriate database on a per-user basis.

Additionally, over time, a social graph can be built based on the connection between John and Bill and, in particular, in the context of the subject area of search engines. In one sense, the weight between these two individuals can be bidirectional. A heavier weight is accorded to John based on these transmissions because he has been the dominant author in these exchanges. If Bill were to become more active and assume an authorship role in this relationship, then the weight metric could shift to reflect his more proactive involvement. In one particular example, a threshold of points is reached in order for Bill's personal vocabulary to include the term 'search engine.' This accounts for the scenario in which a bystander is simply receiving communications in a passive manner.

The architecture discussed herein can continue to amass and aggregate these counts or points in order to build a personal vocabulary (e.g., personal tags) for each individual end user. The personal vocabulary is intelligently partitioned such that each individual has his own group of tagged words to which he is associated. At the same time, a social graph can continue to evolve as end users interact with each other about certain subject areas.

In contrast to other systems that merely identify two individuals having some type of relationship, the architecture provided herein can offer the context in which the relationship has occurred, along with a weighting that is associated with the relationship. For example, with respect to the John/Bill relationship identified above, these two individuals may have their communications exclusively based on the topic of search engines. Bill could evaluate his own personal vocabulary and see that John represents his logical connection to this particular subject matter. He could also evaluate other less relevant connections between his colleagues having (in this particular example) a weaker relationship associated with this particular subject matter. Additionally, an administrator (or an end user) can construct specific communities associated with individual subject matter areas. In one example, an administrator may see that John and Bill are actively involved in the area of search engines. Several other end users can also be identified such that the administrator can form a small community that can effectively interact about issues in this subject area.

In another example, entire groups can be evaluated in order to identify common subject matter areas. For example, one group of end users may be part of a particular business segment of a corporate entity. This first group may be associated with switching technologies, whereas a second group within the corporate entity may be part of a second business segment involving traffic management. By evaluating the vocabulary exchanged between these two groups, a common area of interest can be identified. In this particular example, the personal vocabulary being exchanged between the groups reveals a common interest in the subject of deep packet inspection.

Note that one use of the resulting data is to create a dynamic file for each individual user that is tracked, or otherwise identified through communication system 10. Other applications can involve identifying certain experts (or group of experts) in a given area. Other uses could involve building categories or subject matter areas for a given corporate entity. Note also that communication system 10 could accomplish the applications outlined herein in real time. Further, the association of the end users to particular subject matter areas can then be sent to networking sites, which could maintain individual profiles for a given group of end users. This could involve platforms such as Facebook, LinkedIn, etc. The dynamic profile can be supported by the content identification operations associated with the tendered architecture. In other applications, video, audio, and various multimedia files can be tagged by communication system 10 and associated with particular subject areas, or specific end user groups. In one instance, both the end user and the video file (or the audio file) can be identified and logically bound together or linked.

Software for providing intelligent vocabulary building and ranking of the query results functionality can be provided at various locations. In one example implementation, this software is resident in a network element (e.g., provisioned in connector 40, NCP 32, and/or collector 54) or in another network element for which this capability is relegated. In other examples, this could involve combining connector 40, NCP 32, and/or collector 54 with an application server, a firewall, a gateway, or some proprietary element, which could be provided in (or be proximate to) these identified network elements, or this could be provided in any other device being used in a given network. In one specific instance, connector 40 provides the personal vocabulary building features explained herein, while collector 54 can be configured to offer the ranking of the search query results detailed herein. In such an implementation, collector 54 can initially receive the data, employ its evaluation functions, and process the search query results such that a ranking of the query results is generated.

In other embodiments, the ranking of the search query results features may be provided externally to collector 54, NCP 32, and/or connector 40, or included in some other network device, or in a computer to achieve these intended functionalities. As identified previously, a network element can include software to achieve the ranking of the search query results and vocabulary building operations, as outlined herein in this document. In certain example implementations, the ranking of the search query results and vocabulary building functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in some of the preceding FIGURES] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in some of the preceding FIGURES] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the vocabulary building and ranking of the search query results as outlined herein. Additionally, each of these devices may include a processor that can execute software or an algorithm to perform the vocabulary building and ranking of the search query results activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided herein, interaction may be described in terms of two, three, four, or more network elements. However, this has been done for purposes of clarity and example only. In certain cases, it may be easier to describe one or more of the functionalities of a given set of flows by only referencing a limited number of components or network elements. It should be appreciated that communication system 10 of FIG. 1A (and its teachings) are readily scalable. Communication system 10 can accommodate a large number of components, as well as more complicated or sophisticated arrangements and configurations. Accordingly, the examples provided should not limit the scope or inhibit the broad teachings of communication system 10 as potentially applied to a myriad of other architectures.

It is also important to note that the steps described with reference to the preceding FIGURES illustrate only some of the possible scenarios that may be executed by, or within, communication system 10. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the discussed concepts.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving results of a search query initiated by a user;
   evaluating the received results in relation to a personal profile of the user, wherein the personal profile includes a plurality of characteristics associated with the user and wherein the evaluating comprises comparing the plurality of characteristics to the results;

evaluating the results based on attributes of the user, wherein the attributes include at least one of the user's gender, the user's place of employment, and the user's position at the user's place of employment;
ranking the results to generate a resultant that reflects a ranking of the results in order of likely meaningfulness to the user based on the evaluation; and
communicating the resultant to the user;
wherein the plurality of characteristics comprise at least one characteristic derived from observing the user's behavioral patterns over a period of time and at least one characteristic declared by the user, and
wherein the plurality of characteristics include at least one of a media type preferred by the user, a tag cloud associated with the user, an information flow characteristic associated with the user, past queries associated with the user, previous searches conducted by the user, a topic of interest to the user, a personal vocabulary of the user, and a rating of similar searches.

2. The method of claim 1, wherein at least one of the characteristics is weighted more than another characteristic from the plurality of characteristics.

3. The method of claim 1, further comprising:
evaluating the results based on a social network of the user; and
evaluating the results based on preferences declared by the user.

4. The method of claim 3, wherein evaluating the results based on the social network is done in parallel with evaluating the results based on the attributes and in parallel with evaluating the results based on the preferences.

5. The method of claim 1, wherein the personal profile of the user is created using a personal vocabulary database, wherein the personal vocabulary database comprises a database of words commonly used by the user.

6. The method of claim 1, wherein the personal profile of the user is created using a personalized recommendation engine.

7. One or more non-transitory computer-readable storage media storing instructions that when executed perform a method, the method comprising:
receiving results for a search query initiated by a user;
evaluating the received results in relation to a personal profile of the user, wherein the personal profile includes a plurality of characteristics associated with the user and wherein the evaluating comprises comparing the plurality of characteristics to the results;
evaluating the results based on attributes of the user, wherein the attributes include at least one of the user's gender, the user's place of employment, and the user's position at the user's place of employment;
ranking the results to generate a resultant that reflects a ranking of the results in order of likely meaningfulness to the user based on the evaluation; and
communicating the resultant to the user;
wherein the plurality of characteristics comprise at least one characteristic derived from observing the user's behavioral patterns over a period of time and at least one characteristic declared by the user, and
wherein the plurality of characteristics include at least one of a media type preferred by the user, a tag cloud associated with the user, an information flow characteristic associated with the user, past queries associated with the user, previous searches conducted by the user, a topic of interest to the user, a personal vocabulary of the user, and a rating of similar searches.

8. The one or more non-transitory computer-readable storage media of claim 7, wherein at least one of the characteristics is weighted more than another characteristic from the plurality of characteristics.

9. The one or more non-transitory computer-readable storage media of claim 7, further comprising:
evaluating the results based on a social network of the user; and
evaluating the results based on preferences declared by the user.

10. The one or more non-transitory computer-readable storage media of claim 9, wherein evaluating the results based on the social network is done in parallel with evaluating the results based on the attributes and in parallel with evaluating the results based on the preferences.

11. The one or more non-transitory computer-readable storage media of claim 7, wherein the personal profile of the user is created using a personal vocabulary database comprising words commonly used by the user.

12. The one or more non-transitory computer-readable storage media of claim 7, wherein the personal profile of the user is created using a personalized recommendation engine.

13. An apparatus, comprising:
a memory element configured to store electronic code;
a processor operable to execute instructions associated with the electronic code; and
a recommendation engine and a profile builder module, wherein the apparatus is configured for:
receiving results for a search query initiated by a user;
evaluating the received results in relation to a personal profile of the user, wherein the personal profile includes a plurality of characteristics associated with the user and wherein the evaluating comprises comparing the plurality of characteristics to the results;
evaluating the results based on attributes of the user, wherein the attributes include at least one of the user's gender, the user's place of employment, and the user's position at the user's place of employment;
ranking the results to generate a resultant that reflects a ranking of the results in order of likely meaningfulness to the user based on the evaluation; and
communicating the resultant to the user;
wherein the plurality of characteristics comprise at least one characteristic derived from observing the user's behavioral patterns over a period of time and at least one characteristic declared by the user, and
wherein the plurality of characteristics include at least one of a media type preferred by the user, a tag cloud associated with the user, an information flow characteristic associated with the user, past queries associated with the user, previous searches conducted by the user, a topic of interest to the user, a personal vocabulary of the user, and a rating of similar searches.

14. The apparatus of claim 13, wherein at least one of the characteristics is weighted more than another characteristic from the plurality of characteristics.

15. The apparatus of claim 13, wherein the apparatus is further configured for:
evaluating the results based on a social network of the user; and
evaluating the results based on preferences declared by the user.

16. The apparatus of claim 15, wherein evaluating the results based on the social network is done in parallel with evaluating the results based on the attributes and in parallel with evaluating the results based on the preferences.

17. The apparatus of claim 13, wherein the personal profile of the user is created using a personal vocabulary database comprising words commonly used by the user.

18. The apparatus of claim 13, wherein the personal profile of the user is created using a personalized recommendation engine.

\* \* \* \* \*